US007515166B2

(12) United States Patent
Tsujino et al.

(10) Patent No.: US 7,515,166 B2

(45) Date of Patent: Apr. 7, 2009

(54) LINE HEAD AND IMAGE FORMING APPARATUS USING THE SAME

(75) Inventors: Kiyoshi Tsujino, Nagano (JP); Yujiro Nomura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 945 days.

(21) Appl. No.: 10/744,105

(22) Filed: Dec. 24, 2003

(65) Prior Publication Data

US 2004/0189556 A1 Sep. 30, 2004

(30) Foreign Application Priority Data

Dec. 27, 2002 (JP) .......................... P.2002-381179
Dec. 27, 2002 (JP) .......................... P.2002-381180
Dec. 27, 2002 (JP) .......................... P.2002-381181
Dec. 27, 2002 (JP) .......................... P.2002-381242

(51) Int. Cl.
*B41J 2/435* (2006.01)
*H04N 1/40* (2006.01)

(52) U.S. Cl. ...................................... 347/236; 358/471

(58) Field of Classification Search ................. 358/471, 358/461, 446, 1.15; 347/236, 234, 248, 237, 347/76, 177, 173; 250/204-205; 355/83-84, 355/400

See application file for complete search history.

(56) References Cited

U.S. PATENT DOCUMENTS 5,241,324 A * 8/1993 Tamura et al. .............. 347/240
5,978,403 A 11/1999 Iwasa et al.
6,121,993 A * 9/2000 Maekawara et al. ......... 347/236
6,344,661 B1 2/2002 Nagase et al.

FOREIGN PATENT DOCUMENTS

JP 59-098879 A 6/1984
JP 59-133082 A 7/1984
JP 61-109744 U 7/1986
JP 61-182966 A 8/1986
JP 62-172052 U 10/1987
JP 64-026468 A 1/1989
JP 05-212905 A 8/1993
JP 09-136448 A 5/1997
JP 10-107386 A 4/1998
JP 11-129541 A 5/1999
JP 2000-127492 A 5/2000
JP 2000-000998 A 7/2000
JP 2000-242155 A 9/2000
JP 2000-255101 A 9/2000
JP 2001-113745 A 4/2001

* cited by examiner

*Primary Examiner*—Saeid Ebrahimi Dehkordy
(74) *Attorney, Agent, or Firm*—Sughrue Mion, PLLC

(57) ABSTRACT

A line head includes a plurality of the light emitting element columns which has a main light emitting element column exposing a light amount necessary for exposure to an image carrier and an auxiliary light emitting element column exposing the image carrier so as to obtain the light amount necessary for exposure even when a light emitting element having a pixel defect is existed in the main light emitting element column.

Also, a line head includes a plurality of the light emitting element columns. The light emitting element columns includes a main light emitting element column exposing an image carrier and an auxiliary light emitting element column exposing the image carrier when a light emitting element having a pixel defect is existed in the main light emitting element column.

15 Claims, 18 Drawing Sheets

LINE HEAD AND IMAGE FORMING APPARATUS USING THE SAME

BACKGROUND OF THE INVENTION

The present invention relates to a line head for improving a defect rate of the line head by preventing print quality from being deteriorated even when a pixel defect is present in a light emitting element and an image forming apparatus using the same.

Conventionally, an image forming apparatus using an electrophotography method, such as a copier, a printer, a facsimile or the like generally includes a laser scanning optical system as an optical writing device.

In recent times, there is developed an image forming apparatus using a record array head aligned with a plurality of columns of optical record elements as optical writing device. For example, JP-A61-182966 discloses a record array head in which image data is irradiated to a sensitized drum while shifting the image data in a sub scanning direction. Therefore, an image can be formed at high speed even when an optical record element having a low light emitting output.

Further, JP-A-64-26468 discloses that high speed formation is dealt with by increasing a light emitting amount by using an El element panel aligned with a number of EL elements and making image data flow to the EL element panel at speed equal to speed of moving a sensitized drum. Further, JP-A-11-129541 discloses that when one pixel is multiple recorded by using two columns or more of array chips, gray scale control is carried out by changing a number of light emitting elements to be light emitting.

However, according to a line head having a plurality of light emitting elements in this way, owing to a problem in view of fabricating steps, there is a pixel defect which is not light emitting or a light emitting amount of which is extremely small by a certain probability. For example, when a plurality of columns of light emitting elements are arranged, there is a defect in the light emitting element is 20%. Table 1 shows a calculation of defect rate when a necessary light amount is provided by emitting only one column of light emitting elements in the case that one column of the light emitting elements is arranged in a line head.

TABLE 1

| System | One column head |
|---|---|
| Defect rate | 80.0% |

In Table 1, when two columns of light emitting elements are arranged in a line head and one column thereof is made to be light emitting, since a probability that a pixel defect is present in the column of the light emitting elements is 20%, the defect rate becomes 80% (1-0.2=0.8).

Table 2 shows an example of providing a necessary light amount by carrying out multiple exposure when the defect probability is set to 20%. In this example, there are used two columns of light emitting elements in columns of light emitting elements arranged in a line head by a plurality of columns thereof. In Table 2, when two columns of light emitting elements are arranged in the line head, the defect rate of one column of the light emitting element column is 80% from Table 1 and therefore, the defect rate in this case is $0.8\times0.8=0.64$, that is, 64%.

TABLE 2

| System | Two column head |
|---|---|
| Defect rate | 64.0% |

Further, Table 3 shows the defect rate when a plurality of light emitting elements are arranged in a line head and multiple exposure is carried out by using three columns of light emitting elements. In this case, when the defect probability is set to 20%, the defect rate becomes $0.8^3=0.512$, that is, 51.2%. As shown in Table 1 through Table 3, when a number of columns of light emitting elements is increased, the defect rate of the line head is reduced.

TABLE 3

| System | Three column head |
|---|---|
| Defect rate | 51.2% |

In this way, when the pixel defect is brought about in the light emitting element, there poses a problem that light emitting amounts of the respective light emitting elements differ from each other. Generally, there is a case in which light emitting amounts of light emitting elements differ from each other by a problem in view of fabrication or the like and therefore, in JP-2000-127492, uniform formation of light emitting amounts of respective light emitting elements is achieved by adjusting light emitting areas.

In this way, according to a line head using a plurality of columns of light emitting elements, when a number of pixels is increased, a probability that a pixel defect is present is increased. FIGS. 17A and 17B illustrate explanatory views showing an example of such a pixel defect. In FIG. 17A, there is a pixel defect at a light emitting element Gx in a light emitting element column L0 arranged at a line head. When columns of pixels of Aa through An are scanned and exposed as shown in FIG. 17B by a light emitting element column L0, a white streak extended in a vertical direction as designated by notation Bx is brought about in a print image, print quality is significantly deteriorated and a total of the line head cannot be used.

FIGS. 18A and 18B illustrate explanatory views showing a second example of pixel defect. According to an example shown in FIG. 18A, when columns of light emitting elements of La through Lc are arranged in a line head, there is present a pixel defect at a light emitting element Gy of the light emitting element column Lb. An arrow Y direction of FIG. 18B is defined as a main scanning direction and an X direction is defined as a sub scanning direction. When multiple exposure is carried out while moving an image carder in the sub scanning direction by using the line head of FIG. 18A, as designated by notation By of FIG. 18B, a print image is formed with a portion thinner than other region and image quality is deteriorated.

In this way, according to a line head using a plurality of light emitting elements, it is a serious problem that print quality is deteriorated by deterioration of defect rate by a pixel defect. Further, also when a pixel defect is produced by a deterioration in durability in using a line head, the print quality is significantly deteriorated similarly to thereby pose a problem that a total of the line head needs to replace.

Particularly, in an image forming apparatus applied with a multiple exposure system, a number of light emitting elements is larger than that in the a normal system and the probability that the pixel defect is present is increased. Therefore, there poses a problem that a defect rate is further deteriorated or replacement of the line head owing to the deterioration in durability is increased. In the case of the multiple exposure system, more or less dispersion of luminescence is averaged so as to cancel. However, since the pixel defect is different from other light emitting element in the light emitting amount significantly, an unallowable deterioration of image quality is brought about.

Further, there poses a problem of complicating fabricating steps by achieving uniform formation of the light emitting amount of each light emitting element by adjusting the light emitting area as in JP-A-2000-127492.

SUMMARY OF THE INVENTION

It is therefore an object of the present invention to provide a line head increasing defect rate of the line head by preventing print quality from being deteriorated even when a pixel defect of a light emitting element is present and an image forming apparatus using the same.

In order to achieve the above object, according to the present invention, there is provided a line head, comprising:

- a plurality of the light emitting element columns, including:
  - a main light emitting element column, exposing a light amount necessary for exposure to an image carder; and
  - an auxiliary light emitting element column, exposing the image carrier so as to obtain the light amount necessary for exposure even when a light emitting element having a pixel defect is existed in the main light emitting element column.

Preferably, the auxiliary light emitting element column has a plurality of light emitting elements which correspond to a plurality of light emitting elements of the main light emitting element column respectively. The light emitting elements of the auxiliary light emitting element column respectively emit light to dots of an image region on the image carrier to which the corresponding light emitting elements of the main light emitting element column emit light.

In the configuration, in carrying out multiple exposure by aligning the plurality of columns of light emitting elements to the line head, even when the pixel defect of the light emitting element is present, print quality can be prevented from being deteriorated and a defect rate of the line head can be increased.

Preferably, the auxiliary light emitting element column exposes the image carrier so that an amount of a change in differences between a surface potential Vs|V| and a developing bias potential Vd|V| of the image carrier in a case that the pixel defect is existed at the light emitting elements of the light emitting element columns and in a case that the pixel defect is not existed is equal to or smaller than 10%. That is, the light emtting element is operated at a vicinity of an asymptote of the light attenuating characteristic (PIDC characteristic) of the image carrier. At the vicinity of the asymptote, even when exposure energy is increased, a variation in the surface potential of the image carrier is reduced and therefore, stable exposure can be carried out.

Preferably, both of the main light emitting element column and the auxiliary light emitting element column are driven for scanning the image carrier.

In the configuration, it is not necessary to carry out a control in accordance with whether the light emitting element having the pixel defect is included in any of the light emitting element columns and therefore, a processing of selecting the light emitting element column is not needed and a constitution of a control unit can be simplified.

Preferably, at least one of a light attenuating characteristic (PIDC characteristic) of the image carrier and a light amount of the light emitting elements is set so that an amount of a change in differences between a surface potential Vs|V| and a developing bias potential Vd|V| of the image carrier in a case that the pixel defect is existed at the light emitting elements of the light emitting element columns and in a case that the pixel defect is not existed is equal to or smaller than 10%.

In the configuration, there is achieved an advantage that a deterioration in printing is not brought about even when the light amount of the light emitting element column having the pixel defect is reduced.

Here, it is preferable that, the light emitting elements are organic EL elements. Therefore, the light emitting element can easily be formed on a glass board. Also, the shape of the light emitting element can be formed by an arbitrary shape and therefore, low price formation is achieved.

Preferably, an image forming apparatus provided with the line head, comprising:

an image carrier cartridge, to which the line head is mounted;

a charging unit, charging the image carrier;

a developing unit, developing a toner image on the image carrier; and a transfer unit, transferring the toner image formed on the image carrier onto a transfer medium.

In the configuration, the image forming apparatus in which the image quality is not deteriorated can be provided.

According to the present invention, there is also provided a line head, comprising;

- a plurality of the light emitting element columns, including:
  - a main light emitting element column, exposing an image carrier; and
  - an auxiliary light emitting element column, exposing the image carrier when a light emitting element having a pixel defect is existed in the main light emitting element column.

In the above configuration, when the image carrier is exposed by aligning the plurality of columns of light emitting elements at the line head, even when the pixel defect is present at the light emitting element, the exposure amount is prevented from being deficient to thereby enable to prevent a deterioration in print quality and promote defect rate of the line head.

Preferably, when the light emitting element having the pixel defect is existed in the main light emitting element column, a light emitting of the main light emitting element column including the light emitting element having the pixel detect is stopped. All of the light emitting elements of the auxiliary light emitting element column emit light.

In the configuration, light emittance is controlled to stop and start for each light emitting element column, and therefore a constitution of a control portion is simplified.

Preferably, when the light emitting element having the pixel defect is existed in the main light emitting element column, a light emitting of the light emitting element having the pixel detect is stopped. A light emitting element of the auxiliary light emitting element column corresponding to the light emitting element having the pixel defect emits light so as to compensate a light emitting of the stopped light emitting element.

In the above configuration, even a case in which a plurality of light emitting elements are provided with pixel defects can be dealt with and reliability of forming an image can be promoted.

Preferably, the plurality of light emitting element columns are used in multiple exposure. In the configuration, various image formation can be dealt with.

Preferably, the light emitting elements are organic EL elements. In the configuration, the light emitting element cm easily be formed on a glass board. Therefore, the shape of the light emitting element can be formed in an arbitrary shape and therefore, low price formation is achieved.

Preferably, information regarding the pixel defect is stored in a storing member. In the configuration, since the information regarding the pixel defect is stored to the storing member, the light emitting element having the pixel defect can repeatedly be confirmed. Further, when the image carrier is exposed by aligning the plurality of columns of light emitting elements at the line head, even when the pixel defect is present at the light emitting element, a deterioration in print quality can be prevented by preventing an exposure amount from being deficient and yield of the line head can be promoted.

Preferably, information regarding the main light emitting element column including the light emitting element having the pixel defect is stored in a storing member. Therefore, a control of stopping to emit light and starting to emit light is carried out for each light emitting element column and therefore, even when capacity of the storing member is small, the small capacity can be dealt with. Further, the constitution of the control portion can be simplified.

Preferably, information regarding a position of the light emitting element having the pixel defect in the main light emitting element column is stored in a storing member. Therefore, the position of the light emitting element having the pixel defect can firmly be grasped and even when there are pixel defects in the plurality of light emitting elements, the pixel defects can be dealt with. Therefore, reliability of forming an image can be promoted.

Preferably, the storing member is provided at the line head. Therefore, various image formation can be dealt with.

According to the present invention, there is also provided an image forming apparatus provided with the line head, comprising:

an image carrier cartridge, to which the line head is mounted;

a charging unit, charging the image carrier;

a developing unit, developing a toner image on the image carder, and a transfer unit, transferring the toner image formed on the image carrier onto a transfer medium. Therefore, the image forming apparatus in which image quality is not deteriorated can be provided.

Preferably, the storing member is provided at the cartridge. Therefore, the storing member can be interchanged to a storing portion in correspondence with a pixel defect of a new line head along with interchange of the cartridge.

Preferably, the storing member is provided on a main body side. Therefore, there is achieved an advantage of capable of downsizing the line head and capable of simplifying the constitution of the line head.

According to the present invention, there is also provided a line head, comprising:

a plurality of the light emitting element columns, exposing an image carrier, wherein when a light emitting element having the pixel defect is existed in one light emitting element column of the light emitting element columns, a light emitting of the light emitting element having the pixel detect is stopped; and wherein a light emitting amount of a light emitting element in another light emitting element column of the light emitting element columns which corresponds to the light emitting element having the pixel defect is increased so as to compensate a light emitting of the stopped light emitting element. Therefore, when the image earner is exposed by aligning a plurality of columns of light emitting elements at the line head, even when the pixel defect is present at the light emitting element, a deterioration in print quality is prevented by preventing an exposure amount from being deficient and yield of the line head can be promoted.

Preferably, information regarding the pixel defect is stored in a storing member. Therefore, a state of the drawback of the light emitting element arranged at the line head can be stored. Further, when the line head is interchanged, a state of a drawback of a light emitting element aligned at a new line head is updated to store. In this way, information of a light emitting element in correspondence with each line head is always stored and therefore, reliability of stored data is promoted.

Preferably, the plurality of light emitting element columns are used in multiple exposure. Therefore, various image formation can be dealt with.

Preferably, the light emitting elements are organic EL elements. Therefore, the light emitting element can easily be formed on a glass board. Therefore, the shape of the light emitting element can be formed in an arbitrary shape and therefore, low price formation is achieved.

According to the present invention, there is also provided an image forming apparatus provided with the line head, comprising:

an image carrier cartridge, to which the line head is mounted;

a charging unit, charging the image carrier;

a developing unit, developing a toner image on the image carrier; and a transfer unit, transferring the toner image formed on the image carrier onto a transfer medium.

Therefore, the image forming apparatus in which the image quality is not deteriorated can be provided.

Preferably, the storing member is provided at the cartridge. Therefore, the storing means can be interchanged to a storing portion in correspondence with a pixel defect of a new line head along with interchange of the cartridge.

Preferably, the storing member is provided on a main body side. Therefore, there is achieved an advantage of capable of downsizing the line head and capable of simplifying the constitution of the line head.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 3:
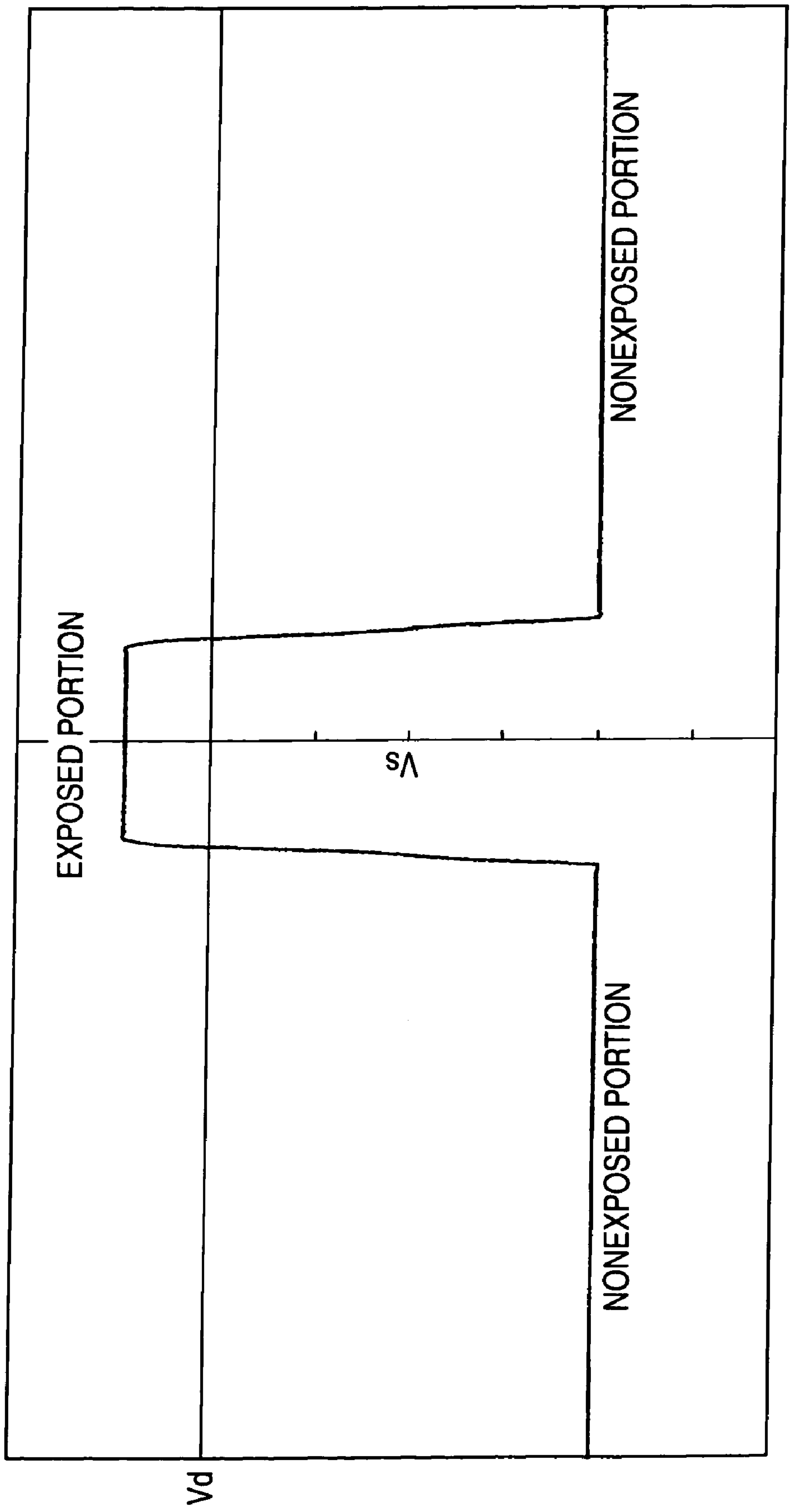
FIG. 3 is a characteristic diagram for explaining the basic principle of the invention.

Embodiments of the invention will be explained in reference to the drawings as follows. FIG. 3 is a characteristic diagram for explaining the basic principle of the invention. FIG. 3 shows a distribution of a surface potential Vs on an exposed portion and a nonexposed portion of an image carrier. Notation Vd designates a developing bias voltage. A light amount necessary for exposure is provided by operating a light emitting element by a voltage equal to or higher than the developing bias voltage.

Figure 1:
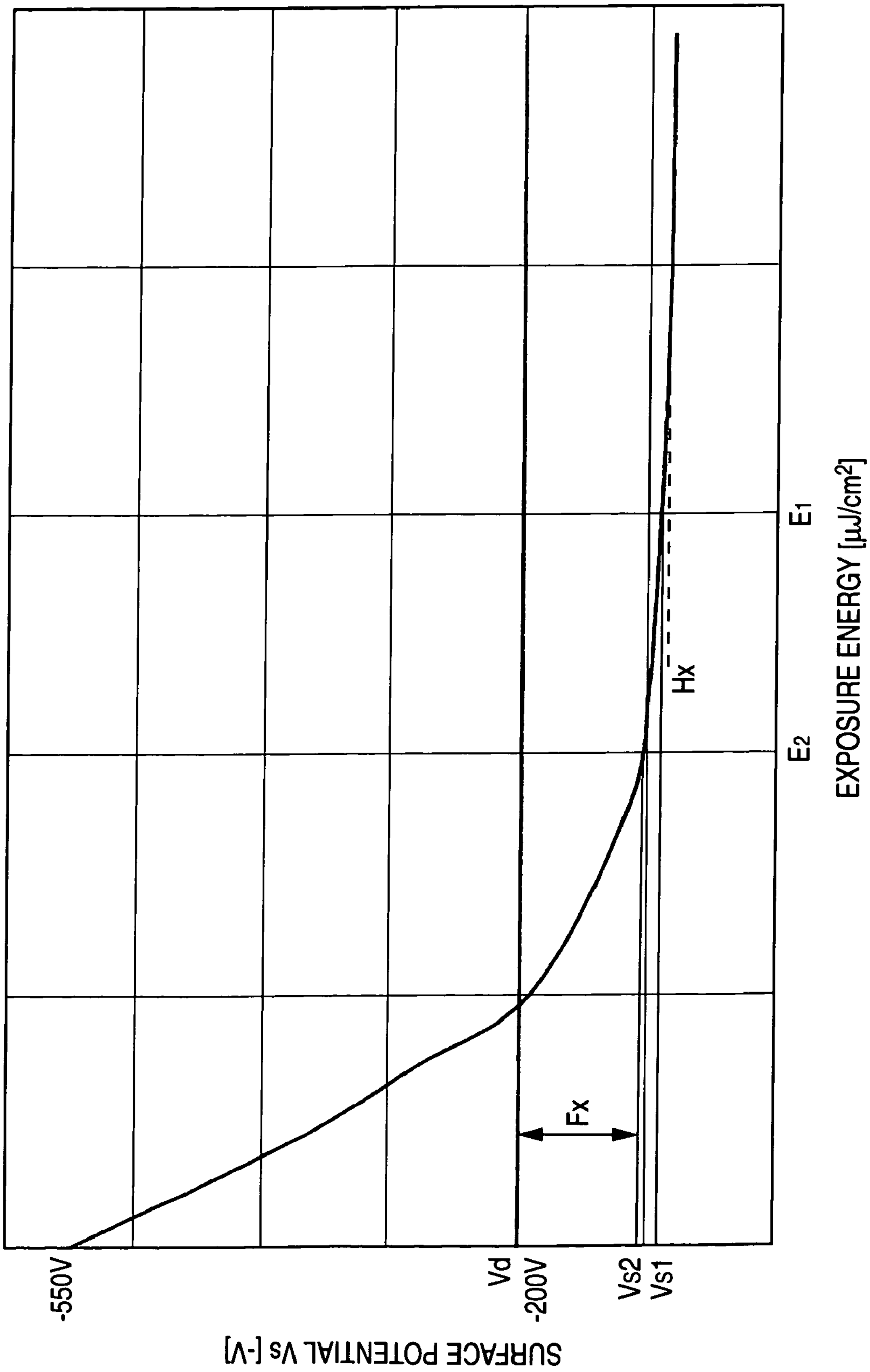
FIG. 1 is a characteristic diagram showing a PIDC characteristic (light attenuating characteristic) of a carrier.

FIG. 1 is a characteristic diagram showing a PIDC characteristic (light attenuating characteristic) of an image carrier. The ordinate of FIG. 1 designates the surface potential Vs (negative potential) of the image carrier and the abscissa designates exposure energy. According to the invention, when a plurality of columns of light emitting elements are aligned in a line head, an alignment in a sub scanning direction of optical elements for exposing the same image region is referred to as a light emitting element group and an alignment in a main scanning direction is referred to as a light emitting element column. In the invention, even when there is a pixel defect at any of the light emitting element group, exposure is carried out by making a potential of a bright portion of an image carrier equal to or higher than the developing bias voltage. Therefore, when there is a pixel defect at any of the light emitting element group, an amount of a change of a difference between the surface potential Vs|V| of the image carrier and the developing bias voltage Vd|V| is set to be equal to or smaller than 10%.

Specifically, when exposure is carried out by a light emitting element group which is not provided with a pixel defect, it is set that Vs=Vs1, V1=Vs1−Vd. Also, when exposure is carried out by a light emitting element group which is provided with a pixel defect, it is set that Vs=Vs2, V2=Vs2−Vd. When the surface potential Vs of the image carrier and the developing bias voltage Vd are set in this way, the following condition of $|(V1-V2/1V)| \leqq 0.1$ is satisfied.

Next, a first embodiment of the invention will be explained in reference to FIGS. 2A and 2B. A process speed is set to 106 mm/s, a charge potential of an image carrier is set to 550V and the developing bias voltage is set to −200V. At this occasion, (a) when exposure is carried out by a light emitting element group which is not provided with a pixel defect:

exposure energy E1=0.4(μJ/cm$^2$)

Vs1=−90V, V1=110V (b) when exposure is carried out by a light emitting element group which is provided with a pixel defect:

exposure energy E2=0.2(μJ/cm$^2$)

Vs2=−100V, V2=100V

At these occasions, a difference between amounts of change of differences between the surface potential Vs|V| of the image carrier and the developing bias voltage Vd|V| becomes 9.1%, the requirement of 10% or less is satisfied and therefore, a nonuniformity in image is not generated.

Further, according to a second embodiment of the invention, the process speed is set to 106 mm/s, the charge potential of the image carrier is set to −550V and the developing bias voltage is set to −200V. At this occasion, (a) when exposure is carried out by a light emitting element group which is not provided with a pixel defect:

exposure energy E1=0.45(μJ/cm$^2$)

Vs1=−85V, V1=115V (b) when exposure is carried out by a light emitting element group which is provided with a pixel defect:

exposure energy E2=0.3(μJ/cm$^2$)

Vs2=−95V, V2=105V

At these occasions; a difference between amounts of change of the differences between the surface potential Vs|V| of the image carrier and the developing bias voltage Vd|V| becomes 8.7%, the requirement of 10% or less is satisfied and therefore, the nonuniformity in image is not generated also in this case.

According to the invention, a change amount of the differences Fx between the surface potential Vs|V| of the image carrier and the developing bias voltage Vd|V| (FIG. 1) is set to be 10% or less. This signifies that the light emitting element is operated at a vicinity of an asymptote Hx of the PIDC curve in the characteristic diagram of FIG. 1. At the vicinity of the asymptote, a variation in the surface potential of the image carrier is reduced so that stable exposure can be carried out, even when the exposure energy is increased.

Figure 2A:
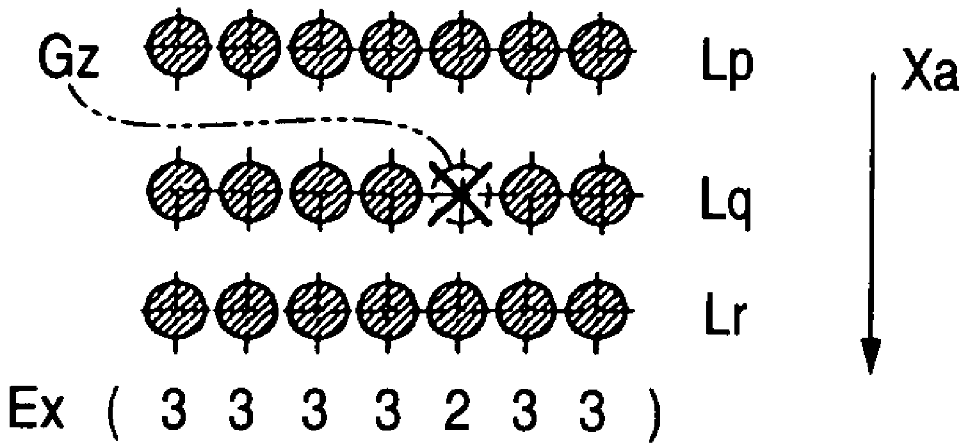
FIGS. 2A and 2B illustrate explanatory views showing a distribution of exposure energy.
Figure 2B:
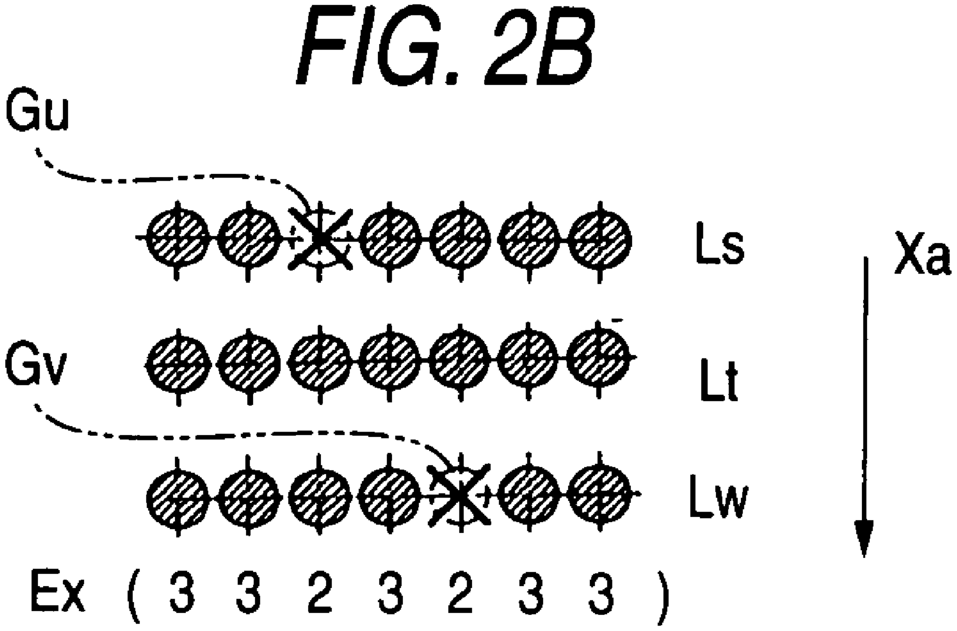

FIGS. 2A and 2B illustrate explanatory views showing a distribution of exposure energy when an image carrier is subjected to multiple exposure in a state that a plurality of columns of light emitting elements of Lp, Lq, Lr are aligned at a line head. In FIG. 2A, there is a pixel defect at a light emitting element Gz of the light emitting element column Lq. There is shown an exposure energy distribution in an Xa direction of a sub scanning direction in this case, that is, an exposure energy distribution of respective light emitting element groups. When exposure energy of one piece of a normal light emitting element is set to 1, exposure energy Ex of the light emitting element group including the light emitting element Gz which is provided with the pixel defect becomes 2, and the exposure energy Ex of the normal light emitting element group becomes 3.

According to the embodiment, as explained in reference to FIG. 1, the light emitting element is operated at the vicinity of the asymptote Hx of the PIDC curve. Therefore, a problem is not posed practically even when the exposure energy is increased since the variation in the surface potential of the image carrier is small. That is, in the example of FIG. 2A, even when a portion in which the exposure energy is "2" and a portion in which the exposure energy USE are mixed, an influence is not effected on quality of print image.

In this way, the light emitting element group is set with the characteristic such that the light amount necessary for exposure is provided even when one or more of the light emitting elements are not light emitted. Further, in the case of carrying out multiple exposure, although at least the light emitting element columns Lp and Lq are needed, the light emitting element column Lr can be considered as an auxiliary light emitting element column for supplementing for the light emitting amount. That is, although the light amount necessary for exposing the image carrier can be ensured by operating the light emitting element columns Lp and Lq (exposure energy is 2), even when a light emitting element group having a pixel defect is assumedly present, the light amount is supplemented, by the light emitting element column Lr arranged as an extra. At this occasion, even when the exposure energy of the light emitting element group which is not provided with the pixel defect is increased from 2 to 3, the quality of the print image is not influenced thereby as described above.

FIG. 2B shows an example in which the pixel defects are present at a light emitting element Gu of a light emitting element column Lw and a light emitting element Gv of a light emitting element column Lw. In this case, when exposure is carried out by the line head while moving the image carrier in the Xa direction of the sub scanning direction, the exposure energy Ex of the light emitting element group having the pixel defect becomes 2 and the exposure energy of the normal light emitting element group becomes 3. Also in this case, although at least the light emitting element columns of Ls and Lt are needed to carry out multiple exposure, the light emitting element column Lw is provided with a function of compensating for the light amount of the light emitting element column having the pixel defect even when there is the pixel defect in a certain one of the light emitting element group.

According to these embodiments, even when a light emitting element having a pixel defect is present by a certain probability, as described above, the respective light emitting element groups are set with the characteristic to provide the light amount necessary in exposing the pixel of the same dot of the image carrier. Therefore, when multiple exposure is carried out by aligning a plurality of columns of light emitting elements at a line head, an uniformity image can be formed without being effected with the influence of the pixel defect of the light emitting element. Further, even when the light emitting element has the pixel defect, it is not necessary to replace the line head and a defect rate of the line head can be promoted.

Further, according to these embodiments, when a plurality of columns of light emitting element columns are arranged at a line head as shown in, for example, FIGS. 2A and 2B, all of the light emitting columns are operated. That is, it is not necessary to carry out a control in accordance with whether a light emitting element having a pixel defect is included in any of light emitting element columns and therefore, a processing of selecting the light emitting element column is not required and a constitution of a control unit is simplified. The fact shows that there is an advantage of being able to carry out printing of an image quality of which is not deteriorated even when a light emitting element having a pixel defect is not specified and therefore, even when presence or absence of the pixel defect is not inspected.

Further, according to these embodiments, the PIDC characteristic of the image carrier is set such that even when one or more of pixel defects are present at any light emitting elements of light emitting element columns aligned in the main scanning direction, the amount of the change of the difference between the surface potential Vs|V| of the image carrier and the developing bias potential Vd|V| becomes 10% or less. Further, the light amount of each light emitting element is set in this way. Therefore, a deterioration in printing is not brought about even when the light amount of the light emitting element column having the pixel detect is reduced.

Next, a third embodiment and a fourth embodiment will be explained with reference to FIGS. 4 through 8.

Figure 7:
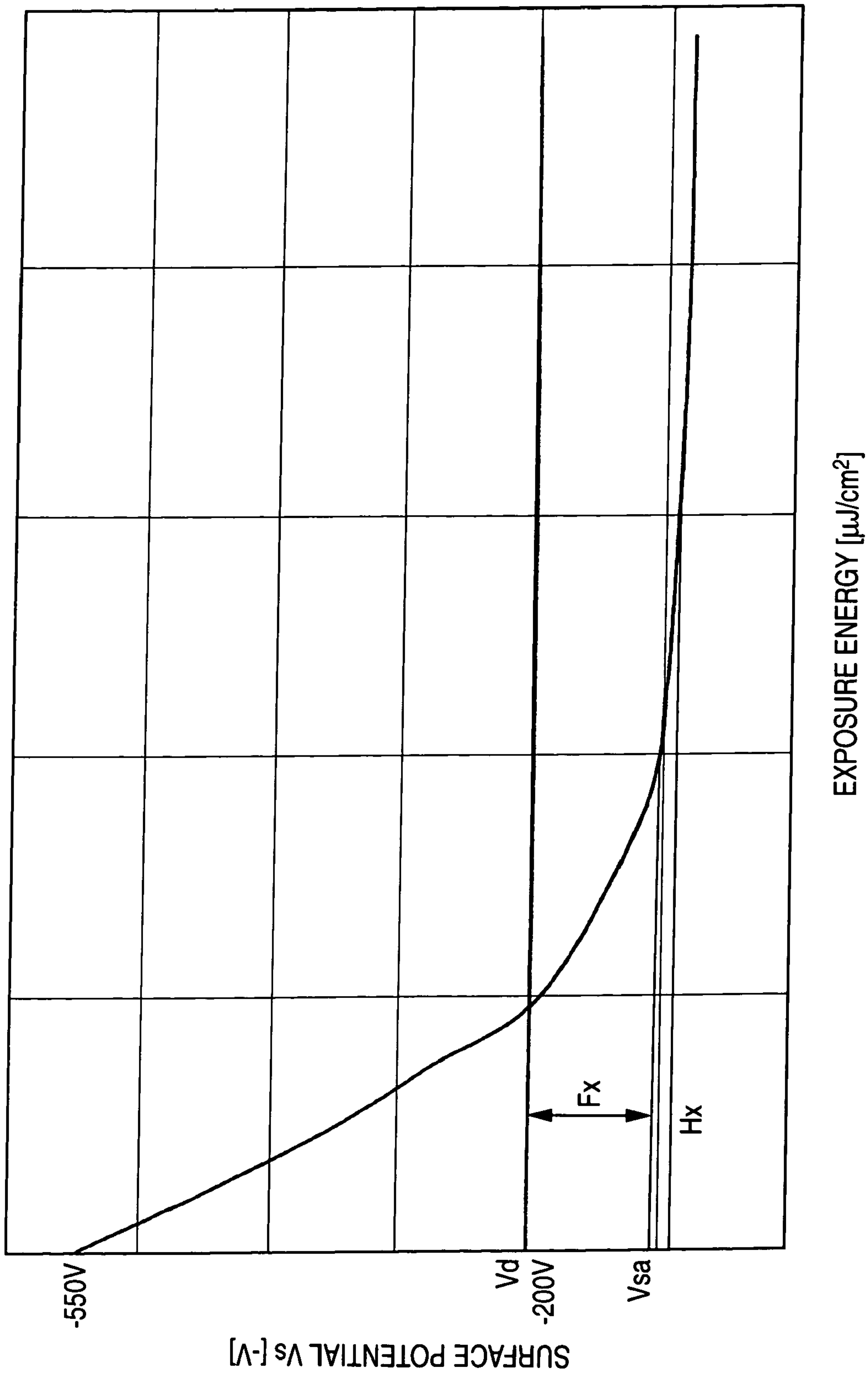
FIG. 7 is a characteristic diagram showing a PIDC characteristic (light attenuating characteristic) of a carrier.

FIG. 7 is a characteristic diagram showing a PIDC characteristic (light attenuating characteristic) of an image carrier. The ordinate of FIG. 7 designates the surface potential Vs (negative potential) of the image carrier and the abscissa designates exposure energy. According to these embodiments, when a plurality of columns of light emitting elements are aligned in a line head, an alignment in a sub scanning direction of optical elements for exposing the same image region is referred to as a light emitting element group and an alignment in a main scanning direction is referred to as a light emitting element column.

In the embodiments of the invention, an amount of a change in a difference Fx between a surface potential Vs|V| of the image carrier and a developing bias voltage Vd|V| is made to be equal to or smaller than 10%. This signifies that the light emitting element is operated at a vicinity of an asymptote Hx of a PIDC curve in the characteristic diagram of FIG. 7. At the vicinity of the asymptote, even when exposure energy is increased, a variation in the surface potential of the image carrier is reduced and stable exposure can be carried out.

According to the embodiments of the invention, in the example of FIG. 7, a charge potential of the image carrier is set to −550V, the developing bias voltage is set to −200V and the surface potential of the image carrier at the vicinity of the asymptote Hx is designated by notation Vsa.

Specifically, when exposure is carried out by a light emitting element group which is not provided with a pixel defect, it is set that $Vs=Vs\mathbf{1}$, $V\mathbf{1}=Vs\mathbf{1}-Vd$. Also, when exposure is carried out by a light emitting element group which is provided with a pixel defect, it is set that $Vs=Vs\mathbf{2}$, $V\mathbf{2}=Vs\mathbf{2}-Vd$. When the surface potential Vs of the image carder and the developing bias voltage Vd are set in this way, the following condition of $|(V\mathbf{1}-V\mathbf{2}/V\mathbf{1})|\leqq 0.1$ is satisfied.

Figure 8A:
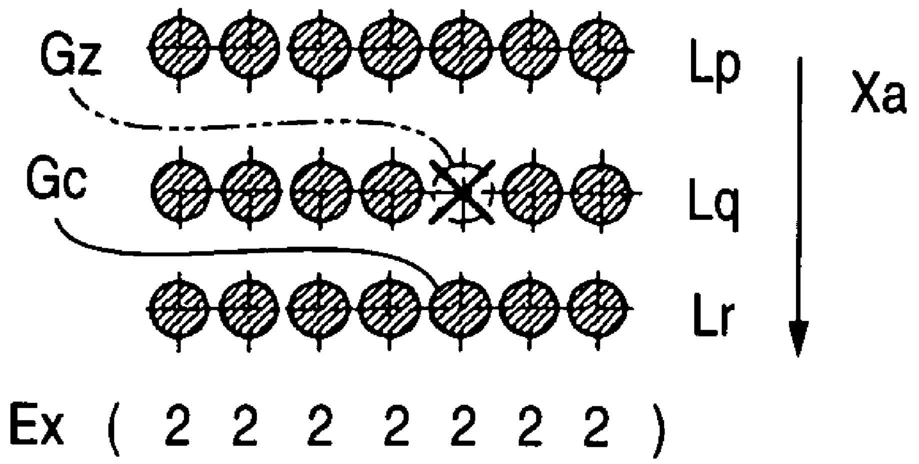
FIGS. 8A and 8B illustrate explanatory views showing examples of aligning light emitting element columns.
Figure 8B:
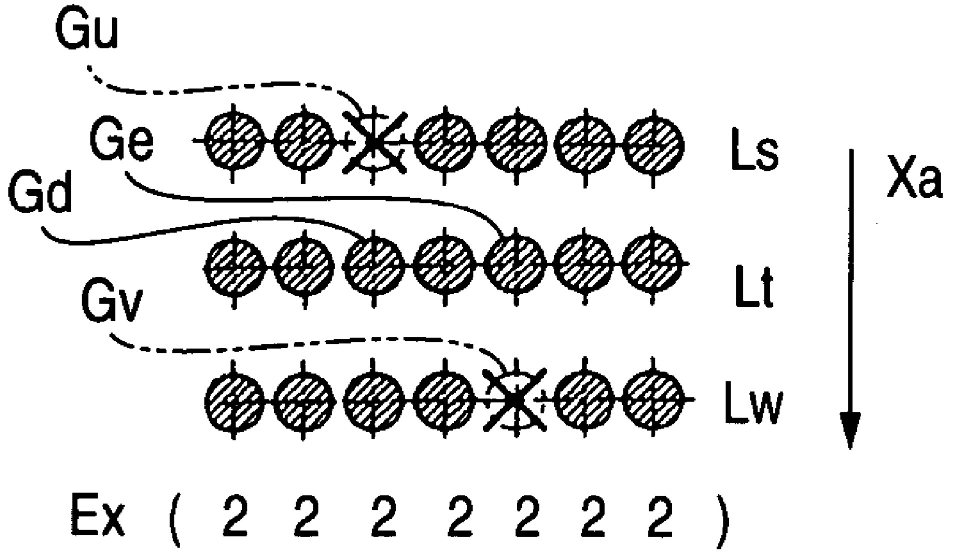

FIGS. 8A and 8B illustrate explanatory views showing a distribution of exposure energy when an image carrier is exposed in a state that a plurality of columns of light emitting elements of Lp, Lq, Lr are aligned at a line head. In FIG. 8A, there is a pixel defect at a light emitting element Gz of the light emitting element column Lq. There is shown an exposure energy distribution in an Xa direction of a sub scanning direction in this case, that is, an exposure energy distribution of respective light emitting element groups.

In FIG. 8A, light emitting element columns Lp and Lq are used for exposing the image carrier, and a light emitting element column Lr is previously formed as a prepartory column. When a light emitting element Gz of the light emitting element column Lq has a pixel defect, the light emitting element of the light emitting element column Lq is not made to emit light and the light emitting element of the light emitting element column Lr of the preparatory column is made to emit light in place thereof. Also, only the light emitting element Gz having the pixel defect in the light emitting element column Lq is not used, and a light emitting element Gc of the light emitting element column Lr is made to emit light in place thereof. The light emitting element Gc constitutes a light emitting element group corresponding to the light emitting element Gz. In this way, when exposure energy of a single piece of a normal light emitting element is set to 1, even when the light emitting element Gz having the pixel defect is brought about, exposure energy Ex of all the light emitting element group becomes 2.

According to the invention, the light emitting element is operated at the vicinity of the asymptote Hx of the PIDC curve as explained in reference to FIG. 7, mentioned above. That is, the light emitting element is operated in a region of providing a light amount necessary for exposing the image carrier. Further, when a pixel defect is brought about in any of the light emitting elements, a light emitting element of a previously set preparatory column is made to emit light. Therefore, a reliable image is formed without deteriorating quality of print image. Further, multiple exposure can also be carried out by the constitution of FIG. 8A. In this case, the image is formed while moving the image carrier in an arrow mark Xa direction. In this way, the invention is applicable also to multiple exposure and therefore, various image formation can be dealt with.

FIG. 8B shows an example in which there are present pixel detects at a light emitting element Gu of a light emitting element column Ls and a lights emitting element Gv of a light emitting element column Lw. In this case, a light emitting element column Lt is selected as a preparatory column which is previously formed. A light emitting element Gd of the light emitting element column Lt included in a light emitting element group of the light emitting element Gu is operated. Further, a light emitting element Ge of the light emitting element column Lt included in a light emitting element group of the light emitting element Gv is operated. Therefore, exposure energy of each light emitting element group becomes 2. Also in FIG. 8B, a multiple exposure system for forming an image while moving the image carrier in the arrow mark Xa direction is applicable.

According to the embodiments, each light emitting element group is set with a characteristic such that a necessary light amount is provided when a pixel of the same dot of the image carrier is exposed as described above even in the case in which there is present a light emitting element bringing about the pixel defect at a certain probability. Therefore, when exposure is carried out in a state that a plurality of columns of light emitting elements are aligned at the line head, an uniformity image can be formed without being influenced by the pixel defect of the light emitting element Further, even when there is the pixel defect, it is riot necessary to replace the line head and defect rate of the line head can be promoted.

Further, according to the embodiments, when a line head is arranged with a plurality of columns of light emitting element columns and further provided with a preparatory column as shown in, for example, FIGS. 6A and 6B, a light emitting element of a light emitting element column having the pixel defect is not made to emit light, and a light emitting element of the preparatory column is made to emit light. That is, a constitution of a control unit is simplified since a control for each light emitting element column is carried out.

Figure 4:
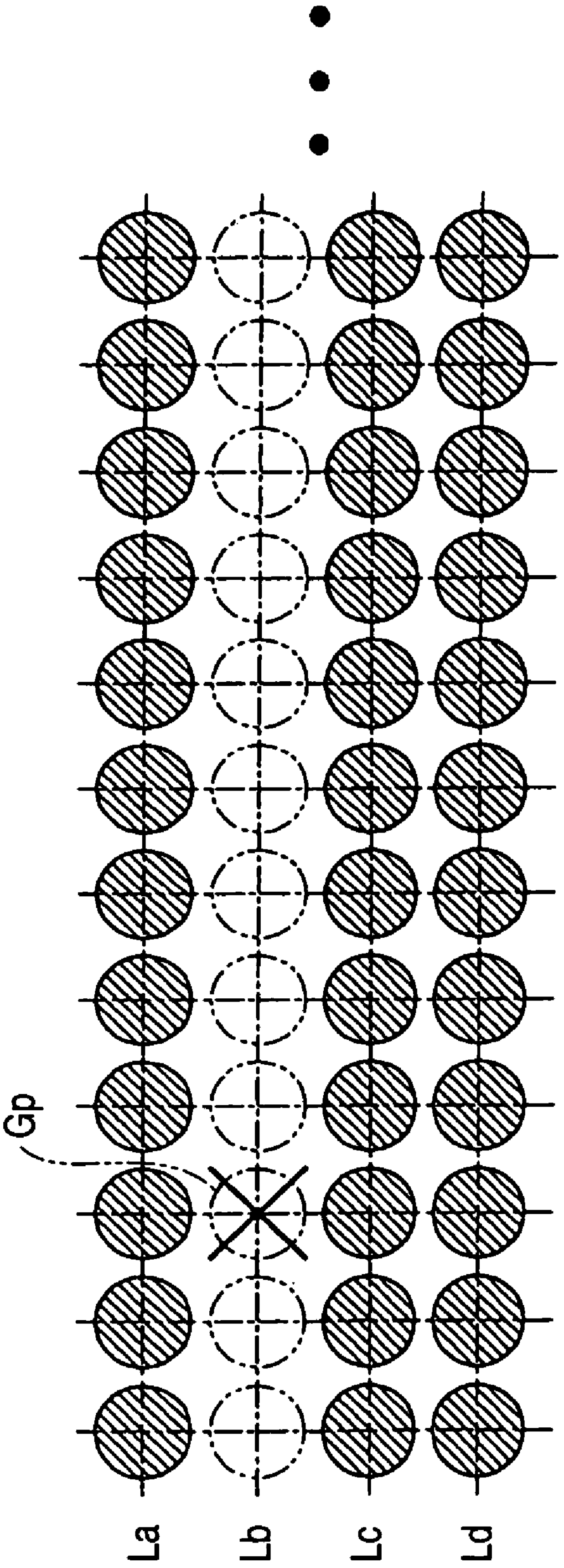
FIG. 4 is an explanatory view showing an example of aligning a light emitting element column.
Figure 5:
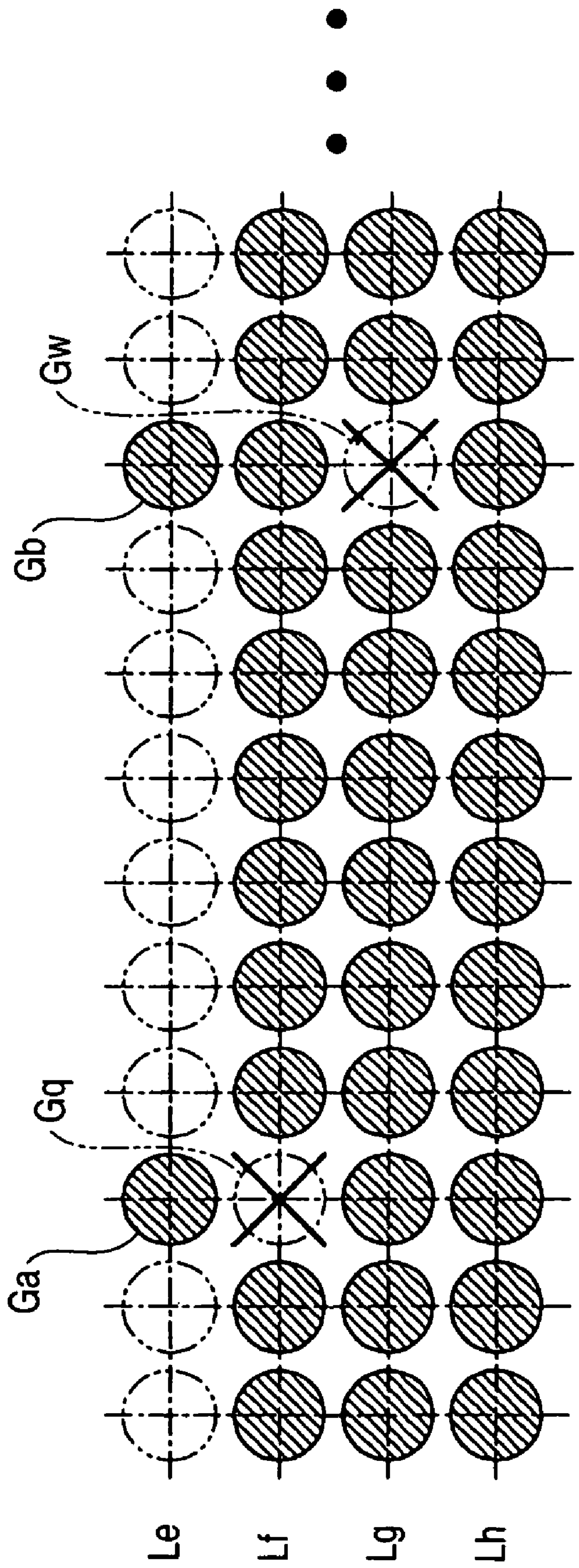
FIG. 5 is an explanatory view showing an example of aligning a light emitting element column.

FIG. 4 and FIG. 5 are explanatory views of the third and fourth embodiments of the invention. In FIG. 4, a line head includes first light emitting element columns Lb through Ld and a second light emitting element column La. The second light emitting element column La is the preparatory column which is previously provided. That is, a light amount necessary for exposing the image carrier is set to provide by a light emitting element group of the first light emitting element columns Lb through Ld.

The line head is provided with a light amount sensor. The light amount sensor inspects whether the light emitting element has a pixel detect, for example, delivery at a factory. In this inspection, it is assumed that the pixel defect is detected, for example, a light emitting element Gp of the light emitting element column Lb included in the first light emitting element column Lb has the pixel defect.

In this case, the first light emitting column Lb is stopped to emit light and the second light emitting element column La is operated in place thereof. Therefore, a situation of being deficient in the exposure amount can be prevented and a deterioration in quality of print image can be prevented by providing a light amount necessary for exposing the image carrier.

In FIG. 5, a second light emitting element column Le is previously provided as a preparatory column. According to the fourth embodiment, it is detected that there are pixel detects in a light emitting element Gq of a light emitting element column Lf and a light emitting element Gw of a light emitting element column Lg included in first light emitting element columns. In this case, in light emitting elements of the preparatory column Le, light emitting elements Ga and Gb are selected to emit light. The respective light emitting elements Ga and Gb are included in respective light emitting element groups corresponding to the light emitting elements having the pixel defects. In this way, according to the fourth embodiment shown in FIG. 5, even a case in which there are pixel defects in the plurality of light emitting elements can be dealt with and durability of forming an image can be promoted. Further, the examples of FIG. 4 and FIG. 5 can be used also as line heads for multiple exposure.

Figure 6:
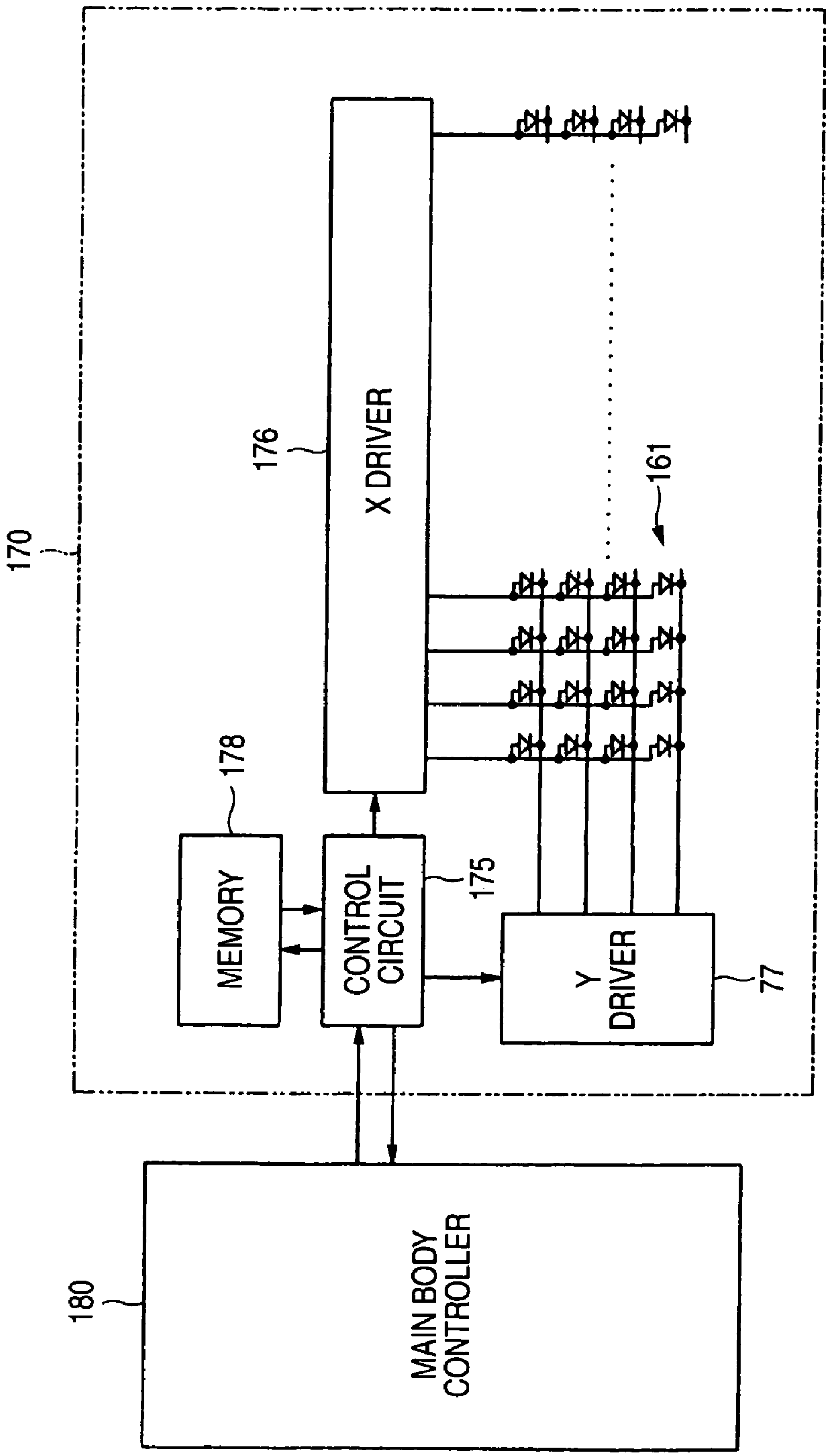
FIG. 6 is a block diagram of a control portion.

FIG. 6 is an outline block diagram showing the control unit of the embodiment. In FIG. 6, a line head 170 has the control unit constituted by TFT or the like as described above. Tee control unit includes a control circuit 175, an X driver 176, a Y driver 177 a memory 178 and an organic EL element 161. The organic EL elements 161 are connected to intersections of output lines of the X driver 176 and the Y driver 177 in a matrix shape. A main body controller 180 is connected to the control unit. Necessary signals or data are received and transmitted between the control unit provided at the line head 170 and the main body controller 180. Information of the light emitting element column having the pixel defect and information of position of the light emitting element having the pixel defect are stored in the memory 178.

The control circuit 175 outputs a control signal to the X driver 176 and the Y driver 177 based on the information of the pixel defect of the light emitting element stored in the memory 178. According to the example of FIG. 4, based on the control signal formed by the control circuit 75, the Y driver 177 outputs the signal so that a control of stopping light emittance of the light emitting element of the light emitting element column Lb and of starting light emittance of the light emitting element of the light emitting element column Lb is carried out. The information of the pixel defect of the light emitting element sending to the control circuit 75 can be acquired by inputting an inspection result by an optical sensor or the like. Further, operation of the light emitting element column Lb including the light emitting element having the pixel defect may be stopped by cutting a lead wire of the light emitting element column.

Next, operation of the control circuit 175 will be explained with regard to the example of FIG. 5. In this case, the light emitting element column Lf is selected by the signal output from the Y driver 177 based on the information of the pixel defect stored in the memory 178. Further, the light emitting element group including the light emitting element Gq having the pixel defect is selected by the signal output from the X driver 176. In this way, the light emitting element Gq is selected to stop emitting of light Further, the light emitting element column Le of the preparatory column is selected by the signal output from the Y driver 177, and the light emitting element Ga included in the light emitting element group corresponding to the light emitting element Gq is selected to emit light.

Similarly, the light emitting element Gw having the pixel defect is stopped to emit light in accordance with the signals output from the X driver 176 and the Y driver 177. Further, the light emitting element column Le of the preparatory column is selected and the light emitting element Gv included in the light emitting element group the same as that of the light emitting element Gw is selected to emit light. In this way, according to the control unit of the embodiments, the signal lines are connected to the respective light emitting elements of the light emitting element columns aligned to the line head in the plurality of columns in the matrix shape and therefore, the light emitting element of the light emitting element column having the pixel defect can be stopped emitting light and the light emitting element of the light emitting element column of the preparatory column can be made to emit light. Further, light emittance can be controlled to stop or light emittance can be controlled to start by selecting an individual light emitting element.

Further, the memory may be provided at a cartridge including the line head. In this case, the storage can be replaced to a storing unit associated with a pixel defect of a new line head along with replacement of the cartridge. Further, the memory can be provide at a main body of the image forming apparatus. In this case, there is achieved an advantage of capable of downsizing a line head and capable of simplifying the constitution.

Next, a fifth embodiment will be explained with reference to FIGS. 9 through 11. According to the embodiments, the light emitting element is operated at the vicinity of the asymptote Hx of the PIDC curve as explained in reference to FIG. 7. That is, the light emitting element is operated at a region in which a light amount necessary for exposing the image carrier is provided. Further, when the pixel defect is brought about in any of the light emitting elements, a light element of a previously set preparatory column is operated. Therefore, a reliable image is formed without deteriorating quality of print image.

According to the embodiment, even when there is present a light emitting element having a pixel defect at a certain probability, each light emitting element group is set to a characteristic such that a necessary light amount is provided when a pixel of the same dot of the image carrier is exposed as described above. Therefore, when exposure is carried out by aligning a plurality of columns of the light emitting elements at the line head, an uniformity image can be formed without being influenced by the pixel defect of the light emitting element. Further, even when there is the pixel defect, it is not necessary to interchange the line head and yield of the line head can be promoted.

Figure 9:
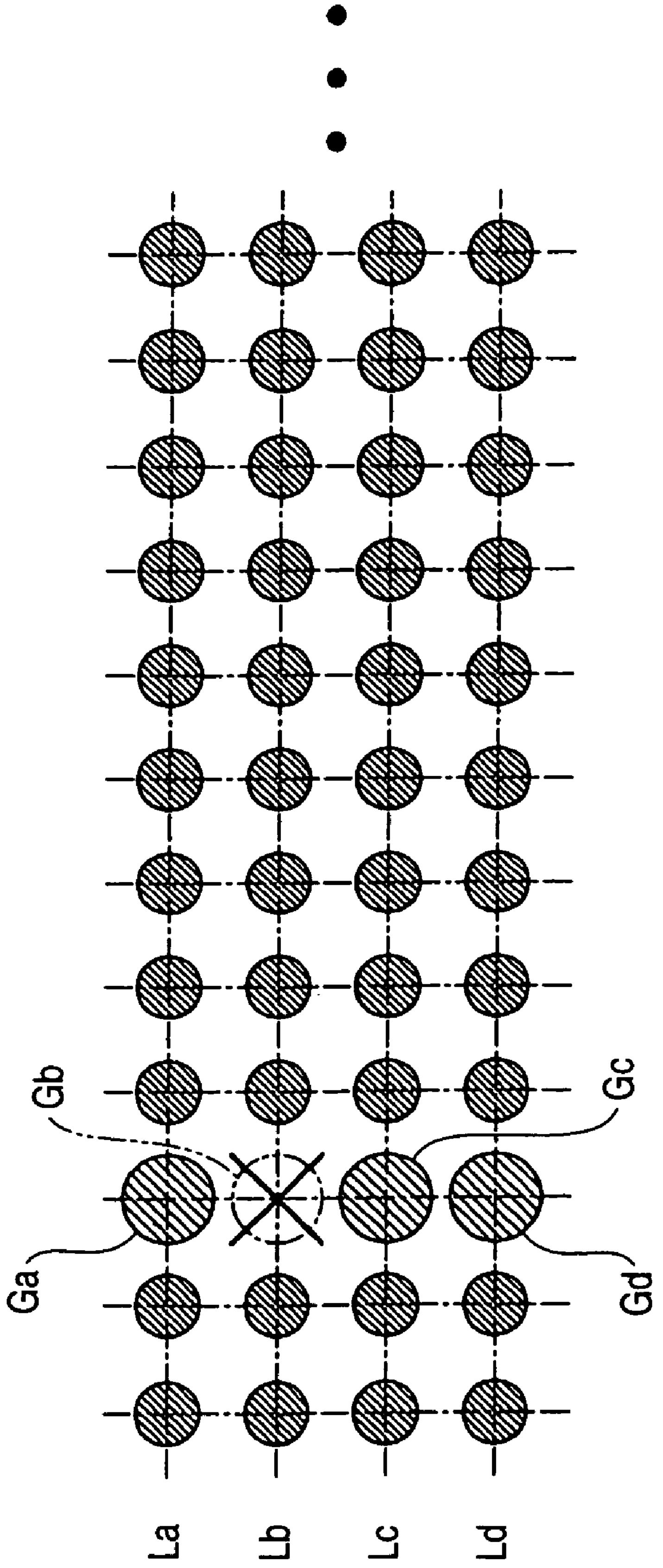
FIG. 9 is an explanatory view showing an example of aligning a light emitting element column.
Figure 10:
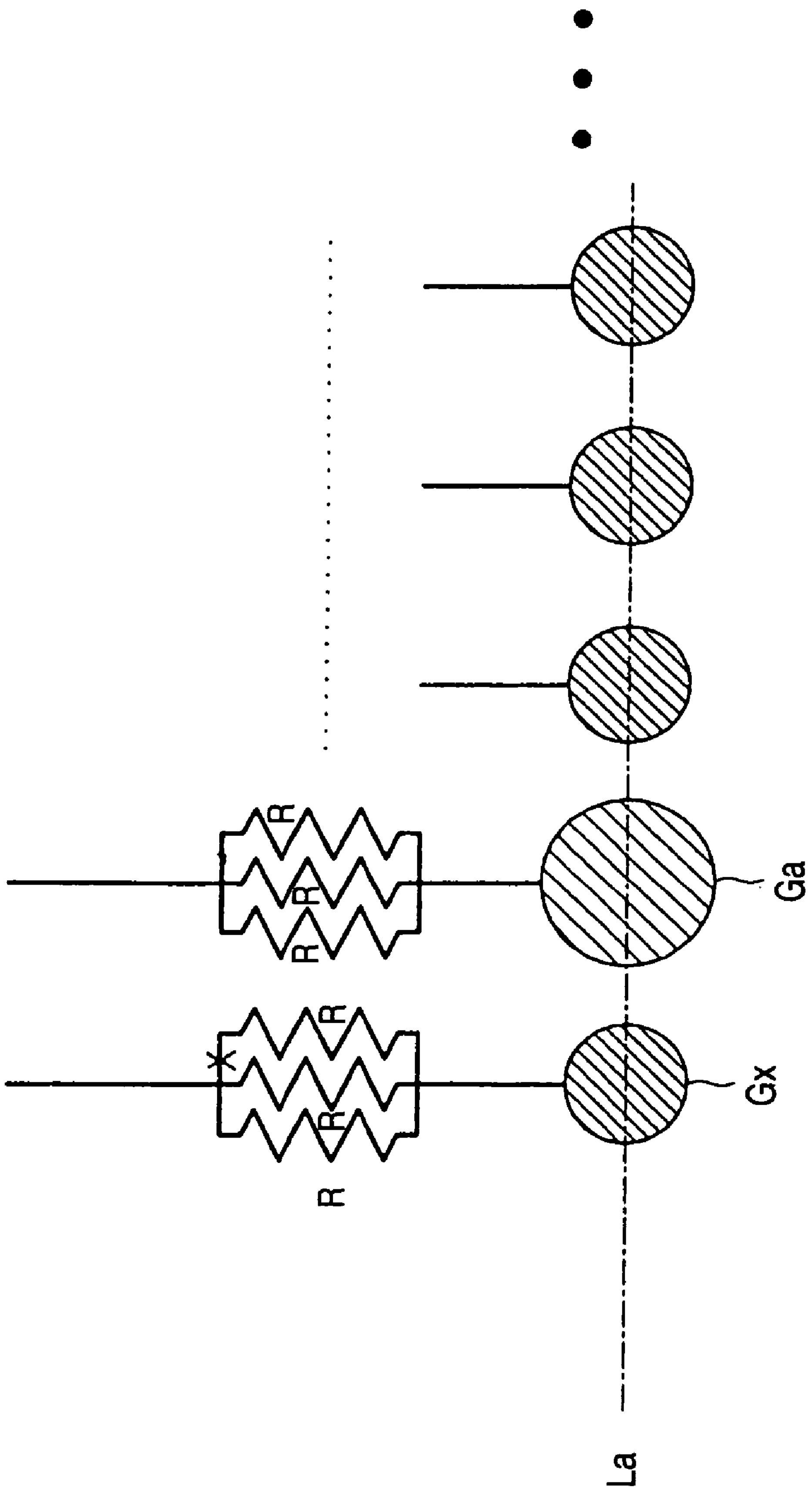
FIG. 10 is an explanatory view showing an example of aligning a light emitting element column.

FIGS. 9 and 10 are explanatory views of the fifth embodiment of the invention. In FIG. 9, a line head has light emitting element columns La through Ld. The line head has a light amount sensor for inspecting whether a light emitting element has a pixel defect, for example, delivery at a factory. It is assumed that a light emitting element having a pixel defect is inspected by the inspection, for example, a light emitting element Gb of a light emitting element column Lb has the pixel defect. In this case, the light emitting element column Lb is stopped emitting light and light emitting amounts of light emitting elements Ga, Gc and Gd included in a light emitting element group the same as that of the light emitting element column Lb are adjusted so as to increase. Such an adjustment can be carried out by, for example, increasing amounts of current supplied to the light emitting elements of the light emitting element group.

In this way, the light emitting amounts of the respective light emitting elements of the light emitting element group aligned in a sub scanning direction of the image carrier are increased and therefore, even when the light emitting element having the pixel defect is included in the light emitting element group, a situation of being deficient in: the exposure amount can be prevented. Therefore, a deterioration in quality of print image can be prevented by providing the light amount necessary for exposing the image carrier.

Further, multiple exposure can be carried out by using the line head having the constitution of FIG. 9. In this case an image is formed while moving the image carrier in the sub scanning direction. In this way, the invention is applicable to multiple exposure and therefore, various image formation can be dealt with.

According to the example of FIG. 10, the light emitting amount is controlled by adjusting a resistance value connected to the light emitting element. As shown in FIG. 10, each light emitting element can be connected with three pieces of resistors having an equal resistance value R in parallel. Normally, a single piece of the resistors connected to each light emitting element is cut off by an electronic switch or the like as shown in a light emitting element Gx. That is, the resistance value is set to (R/2).

With regard to a light emitting element Ga of a light emitting element group having a pixel defect, the resistance value is reduced by turning on the electronic switch so that a resistance value becomes a resistance value (R/3). Therefore, when it is assumed that same voltage is applied to the respective light emitting elements, current flowing to the light emitting element Ga is increased more than other light emitting element of the same light emitting element column and the light emitting amount of the light emitting element Ga is increased.

In this way, according to the example of FIG. 10, the light emitting amount can be controlled by adjusting a resistor circuit connected to the light emitting element. Further, the examples of FIG. 9 and FIG. 10 can be used also as line heads for multiple exposure.

Figure 11:
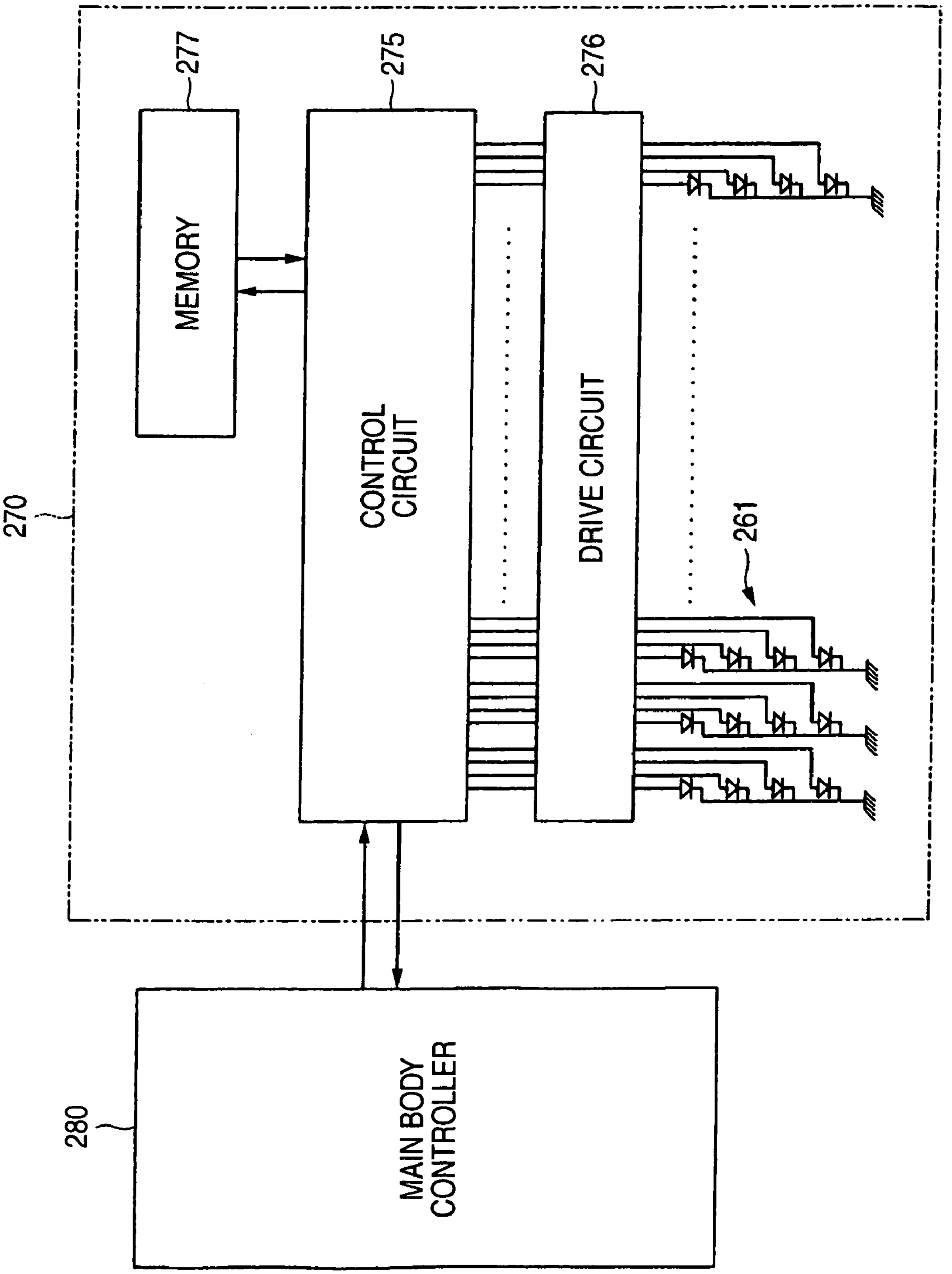
FIG. 11 is a block diagram of a control portion.

FIG. 11 is an outline block diagram showing a constitution of a control unit according to the fifth embodiment of invention. In FIG. 11, a line head 270 has a control unit constituted by TFT or the like. The control unit has a control circuit 275, a drive circuit 276, a memory 277 and an organic EL element 261. The organic EL element 261 is connected to the drive circuit 276. A main body controller 280 is connected to the control unit. Necessary signals or data are received and transmitted between the control unit provided at the line head 270 and the main body controller 280.

Information of the pixel defect of the light emitting element is stored in the memory 277. That is, the memory 277 is served as a storage storing the information regarding the pixel defect. The control circuit 275 outputs a control signal to the drive circuit 276 based on the information of the pixel defect of the light emitting element in the example of FIG. 9, a control is carried out to increase light emitting amounts of the respective light emitting elements of a light emitting group having the pixel defect based on a control signal formed by the control circuit 275.

Since the line head 270 is provided with the memory 277 for storing the pixel defect, a state of a drawback of the light emitting element arranged at the line head can be stored. Further, when the line head is replaced, a state of the drawback of a light emitting element aligned at a new line head is updated to store. In this way, information of a light emitting element in correspondence with each line head is always stored and therefore, reliability of stored data is promoted.

Further, the memory may be provided at a cartridge including the line head. In this case, the storage can be replaced to a storing unit in correspondence with a pixel defect of a new line head along with replacement of the cartridge. Further, the memory can also be provided at a main body of the image forming apparatus. In this way, there is achieved an advantage of capable of downsizing the line and capable of simplifying the constitution.

Figure 12:
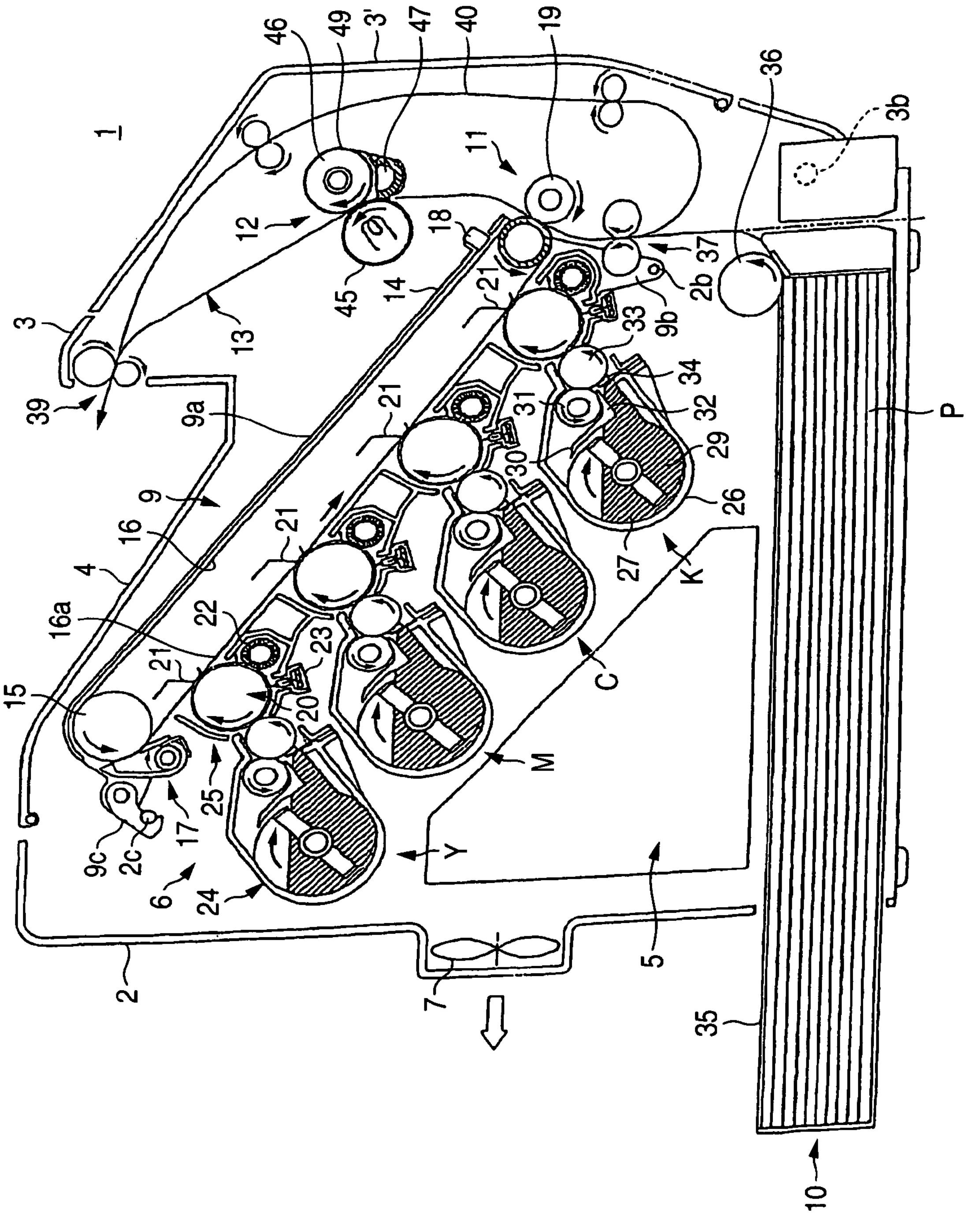
FIG. 12 is a schematic sectional view showing a total constitution of an image forming apparatus.

FIG. 12 is a schematic sectional view showing a total constitution of an image forming apparatus to which the above embodiments are applied. The image forming apparatus is an example of using an intermediate transfer belt as a transfer belt.

In FIG. 12, an image forming apparatus 1 includes a housing main body 2, a first opening/closing member 3 mounted openably and closably to a front face of the housing main body 2 and a second opening/closing member (which serves also as a discharging tray) 4 mounted openably and closably to an upper face of the housing main body 2. Further, the first opening/closing member 3 is provided with an opening/closing lid 3' mounted openably and closably to the front face of the housing main body 2 and the opening and closing lid 3' is made to be openable and closable cooperatively with or independently from the first opening/closing member 3.

Inside of the housing main body 2 is arranged with an electric equipment box 5 including a power source circuit board and a control circuit board, an image forming unit 6 a wind blowing fan 7, a transfer belt unit 9, and a sheet feeding unit 10 and inside of the first opening/closing member 3 is arranged with a secondary transfer unit 11, a fixing unit 12 and a record medium transporting unit 13. Expendables at inside of the image forming unit 6 and the sheet feeding unit 10 are constituted to be attachable to and detachable from the main body and in that case, the expendables are constituted to be able to be repaired or interchanged by being removed therefrom including the transfer belt unit 9.

On both sides of a lower portion of the front face of the housing main body 2, the first opening/closing member 3 is mounted openably and closably to the housing main body 2 via a rotating shaft 3*b*. The transfer belt unit 9 is provided with a drive roller 14 arranged on a lower side of the housing main body 2 and driven to rotate by a drive source, not illustrated, a drive roller 15 arranged on a skewed upper side of the drive roller 14, a intermediate transfer belt 16 stretched between the two pieces of rollers 14 and 15 and driven to circulate in an illustrated arrow mark direction and a cleaning unit 17 brought into contact with and separated from a surface of the intermediate transfer belt 16.

The driven roller 15 and the intermediate transfer belt 16 are arranged in a direction of inclining to the left side of the drawing relative to the drive roller 14. Thereby, a belt face 16*a* constituting a downward belt transporting direction in driving the intermediate transfer belt 16 is disposed on a lower side. The drive roller 14 and the driven roller 15 are rotatably supported by a support frame 9*a* and a pivoting portion 9*b* is formed at a lower end of the support frame 9*a*. The pivoting portion 9*b* is fitted to a pivoting shaft (pivoting fulcrum) 2*b* provided at the housing main body 2, thereby, the support frame 9*a* is pivotably mounted to the housing main body 2.

Further, an upper end of the support frame 9*a* is pivotably provided with a lock lever 9*c* and the lock lever 9*c* is made to be lockable by a locking shaft 2*c* provided at the housing main body 2. The drive roller 14 serves also as a backup roll of a secondary transfer roller 19 constituting the secondary transfer unit 11. Further, the driven roller 15 is made to serve also as a backup roller of the cleaning unit 17. The cleaning unit 17 is provided on a side of the belt face 16*a* in the downward transporting portion.

Primary transfer members 21 comprising leaf spring electrodes are brought into contact with the rear face of the belt face 16*a* in the downward transporting direction of the intermediate transfer belt 16 by elastic force thereof opposedly to image carriers 20 of respective image forming stations Y, M, C, K and the primary transfer member 21 is applied with transfer bias. The support frame 9*a* of the transfer belt unit 9 is installed with a test pattern sensor 18 proximate to the drive roller 14. The test pattern sensor 18 is a sensor for positioning respective color toner images on the intermediate transfer belt 16, detecting the darknesses of the respective color toner images and correcting color shifts and image darknesses of the respective color images.

The image forming unit 6 is provided with the image forming stations Y (for yellow), M (for magenta), C (for cyan) and K (for black) for forming a plurality (four according to the embodiment) of different colors of images. Each of the image forming stations Y, M, C, K includes the image carrier 20 comprising a sensitized drum, a charging unit 22, an image writing unit 23 and a developing unit 24 arranged at a surrounding of the image carrier 20.

Notations of the charging unit 22, the image writing unit 23 and the developing unit 24 are attached only to the image forming station Y and the notations are omitted for other image forming stations since constitutions thereof stay the same. Further, an order of arranging the respective image forming stations Y, M, C, K is arbitrary. Further, the image carriers 20 of the respective image forming stations Y, M, C, K are brought into contact with the belt face 16*a* in the downward transporting direction of the intermediate transfer belt 16, as a result, the respective image forming stations Y, M, C, K are also arranged in the direction of inclining to the left side of the drawing relative to the drive roller 14. The image carrier 20 is driven to rotate in the direction of transporting the intermediate transfer belt 16 as shown in an illustrated arrow mark.

The charging unit 22 is constituted by a conductive brush roller connected to a high voltage generating source and an outer periphery of the brush is brought into contact with the image carrier 20 which is a sensitized member to rotate in a direction reverse thereto and at a peripheral speed two through three times as much as that of the image carrier 20 to thereby uniformly charge the surface of the image carrier 20. Further, when such a conductive brush roller is used in an image forming apparatus of a cleanerless constitution as in the embodiment, there can be constructed a constitution in which a transcription remaining toner adhered to the brush roller is discharged to the image carrier 20 by applying a bias having a polarity the same as the polarity of charging the toner to the brush roller when the image is not formed to transcribe onto the intermediate transfer belt 16 at a primary transfer portion and to recover by the cleaning unit 17 of the intermediate transfer belt 16.

The image writing unit 23 uses an organic EL array exposure head aligned with organic EL luminous elements in shapes of columns in an axial direction of the image carrier 20. The organic EL array exposure head is provided with an advantage of being compact since an optical path thereof is shorter than that of a laser scanning optical system, capable of being arranged proximate to the image carrier 20 and capable of downsizing a total of the apparatus. The image carrier 20, the charging unit 22 and the image writing unit 23 of each of the image forming stations Y, M, C, K are unitized as a single image carrier unit 25.

Further, there is constructed a constitution of maintaining to position the organic EL array exposure head relative to the image carder 20 by making the unit interchangeable from the support frame 9*a* along with the transfer belt unit 9. Further, when the image carrier unit 25 is interchanged, the image carrier unit 25 is constituted to be interchanged by including the organic EL array exposure head.

Next, an explanation will be given of details of the developing unit 24 by taking an example of the image forming station K. The developing unit 24 includes a toner storing vessel 26 for storing a toner (hatched portion of the drawing), a toner storing portion 27 formed at inside of the toner storing vessel 26, a toner stirring member 29 arranged at inside of the toner storing portion 27 and a partitioning member 30 formed to partition at an upper portion of the toner storing portion 27.

Further, there are provided a toner supply roller 31 arranged on an upper side of the partitioning member 30, a blade 32 provided at the partitioning member 30 and brought into contact with the toner supply roller 31, a developing roller 33 arranged to be brought into contact with the toner supply roller 31 and the image carrier 20 and a restricting blade 34 brought into contact with the developing roller 33. The image carrier 20 is rotated in the direction of transporting the intermediate transfer belt 16, the developing roller 33 and the supply roller 31 are driven to rotate in a direction reverse to the direction of rotating the image carrier 20 as shown in illustrated arrow marks, meanwhile, the stirring member 29 is driven to rotate in a direction reverse to the direction of rotating the supply roller 31.

The toner stored and conveyed up by the stirring member 29 in the toner storing portion 27 is supplied to the toner supply roller 31 by slidingly rubbing the blade 32 and supplied to the surface of the developing roller 33 by an adhering force by a mechanical adhering force and a friction charging force to recessed and projected portions of the surface of the supply roller 31. The toner supplied to the developing roller 33 is restricted to a layer thickness of a predetermined thickness by the restricting blade 34 and a toner layer formed into a thin layer is transported to the image carrier 20. The toner layer develops a latent image portion of the image carrier at a nip portion constituted by bringing the developing roller 33 and the image carrier 20 into contact with each other and a vicinity thereof.

There is constructed a constitution in which the developing roller 33 and the contact portions of the toner supply roller 31 and the developing roller 33 and the restricting blade 34 on a side opposed to the image carrier 20 are not embedded in the toner at inside of the toner storing portion 27. By the constitution, a variation of a pressure in bringing the restricting blade 34 into contact with the developing roller 33 by a reduction in the stored toner can be prevented and filming of the developing roller 33 can be prevented since extra toner scraped off from the developing roller 33 by the restricting blade 34 is dropped to the toner storing portion 27.

The toner returned to the toner storing portion 27 is stirred along with the toner at inside of the toner stirring portion 27 by the stirring member 27 and is supplied again to a toner introducing portion at a vicinity of the supply roller 31 by the stirring member 29. Therefore, the extra toner is dropped to the lower side without being stagnant at the sliding rubbing portion of the supply roller 31 and the developing roller 33 and the contact portion of the developing roller 33 and the restricting blade 34 to stir along with the toner of the toner storing portion 27 and therefore, it can be prevented that a deterioration of the toner at inside of the developing unit is gradually progressed and an abrupt change in image quality is brought about immediately after interchanging the developing unit.

Further, the sheet feeding unit 10 is provided with a sheet feeding portion comprising a sheet feeding cassette 35 in which a record medium P is laminated to hold and a pickup roller 36 for feeding the record medium P from the sheet feeding cassette 35 sheet by sheet. Inside of the first opening/closing member 3 is provided with a resist roller pair 37 for prescribing timings of feeding the record medium P to the secondary transfer portion, the secondary transfer unit 11 as a secondary transfer unit brought into press contact with the drive roller 14 and the intermediate transfer belt 16, the fixing unit 12, the record medium transporting unit 13, a discharge roller pair 39 and a transport path 40 for both faces printing.

The fixing unit 12 includes a rotatable heating roller 45 including a heat generating member of a halogen heater or the like, a pressing roller 46 for urging to press the heating roller 45, a belt stretching member 47 arranged pivotably to the pressing roller 46 and a heat resistant belt 49 stretched between the pressing roller 45 and the belt stretching member 47. A color image secondarily transcribed onto the record medium is fixed to the record medium at predetermined temperature by a nip portion formed by the heating roller 45 and the heat resistant belt 49.

According to the image forming apparatus, the fixing unit 12 can be arranged at a space formed on a skewed upper side of the intermediate transfer belt 16, in other words, a space on a side of the intermediate transfer belt 16 opposed to the image forming unit 6 to thereby enable to reduce heat transfer to the electric equipment box 5, the image forming unit 6 and the intermediate transfer belt 16. Therefore, a frequency of carrying out operation of correcting color shifts of respective colors can be reduced.

An outline of operation of a total of the image forming apparatus as described above is as follows.

(1) When a printing instruction signal (image forming signal) from a host computer or the like (personal computer or the like), not illustrated, is input to a control circuit at inside of the electric equipment box 5, the image carriers and the respective rollers of the developing unit 24 of the respective image forming stations Y, M, C, K and the intermediate transfer belt 16 are driven to rotate. (2) The surface of the image carrier 20 is uniformly charged by the charging unit 22.

(3) In the respective image forming stations Y, M, C, K, the surfaces of the uniformly charged image carriers 20 are subjected to selective exposure in accordance with image information of respective colors by the image writing unit 23 to thereby form electrostatic latent images for respective colors. (4) The electrostatic latent images formed at the respective image carriers 20 are developed into toner images by the developing unit 24.

(5) The primary transfer members 21 of the intermediate transfer belt 16 are applied with primary transfer voltage having a polarity inverse to the polarity of charging the toner and the toner images formed on the image carriers are overlapped to transcribe on the intermediate transfer belt 16 successively in accordance with movement of the intermediate transfer belt 16 at the primary transfer portion. (6) In synchronism with movement of the intermediate transfer belt 16 primarily transcribed with the primary images, the record medium P contained in the sheet feeding cassette 35 is fed to the secondary transfer roller 19 via the resist roller pair 37.

(7) The primary transcribed image synchronizingly conjoins with the record medium at the secondary transfer portion and is applied with a bias having a polarity inverse to that of the primary transcribed image by the secondary transfer roller 29 pressed to the drive roller 14 of the intermediate transfer belt 16 by a pressing mechanism. By applying such a bias of the inverse polarity, the primary transcribed image formed on the intermediate transfer belt 16 is secondarily transcribed onto the record medium synchronizingly fed.

(8) The transcription remaining toner in the secondary transcription is transported in the direction of the driven roller 15 and scraped off by the cleaning unit 17 arranged opposedly to the roller 15, further, the intermediate transfer belt 16 is refreshed to enable to repeat again the above-described cycle.
(9) The toner image on the record medium is fixed by passing the record medium through the fixing unit 12, thereafter, the record medium is transported to a predetermined position (to the discharge tray 4 when both faces printing is not carried out and to the transport path 40 for both faces printing when both faces printing is carried out).

Figure 13:
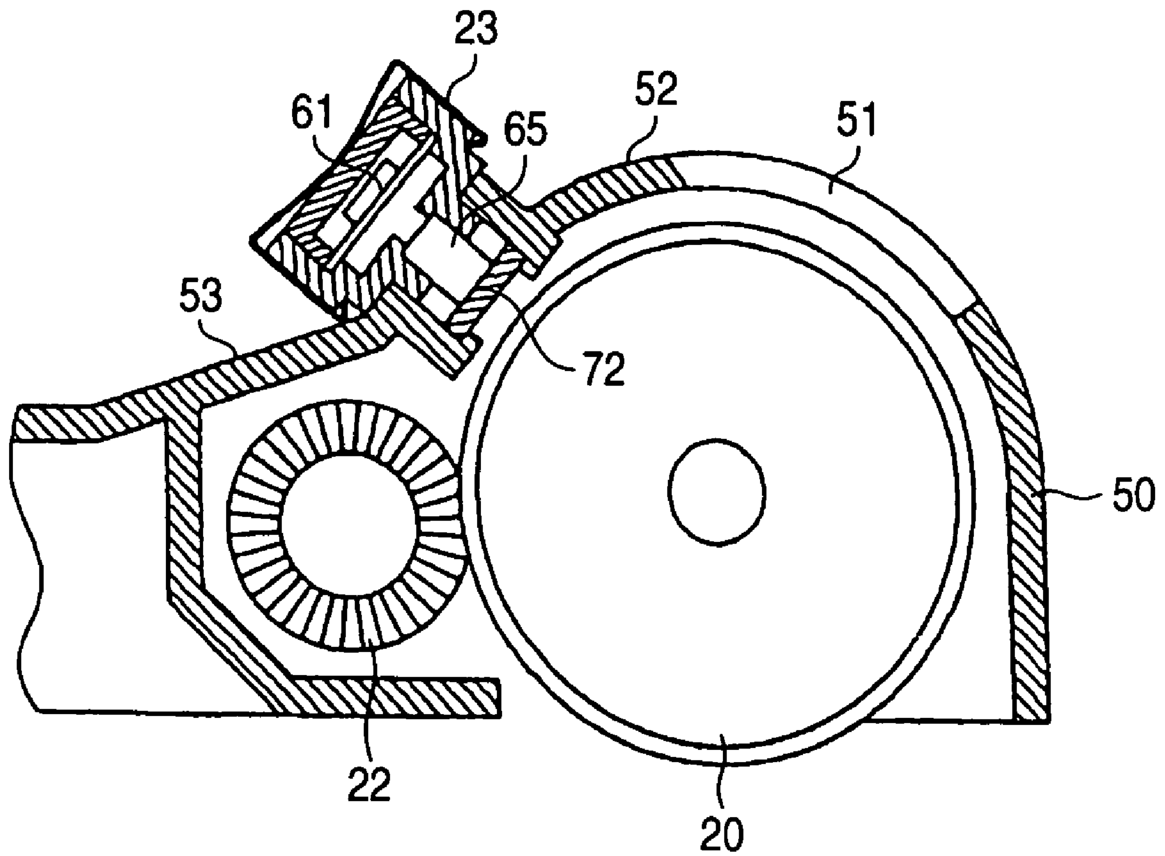
FIG. 13 is a sectional view showing to enlarge a portion of FIG. 12.

FIG. 13 is a partially sectional view at a vicinity of the image carrier 20 of FIG. 12. According to the image carrier unit 25, four pieces of the image carriers (sensitized drums) 20 of the image forming stations Y, M, C, K are rotatably supported in cases 50 each comprising a nontransparent metal plate or the like in which a side thereof in contact with the intermediate transfer belt 16 is opened remote from each other and in parallel with each other.

The conductive brush roller of the charging unit 22 is supported at a predetermined portion of each image carrier 20 to be brought into contact therewith to rotate and on the downstream side of the charging unit 22, the image writing unit 23 comprising the organic EL array exposure head is positioned relative to each image carrier 20 and supported thereby in parallel therewith. A wall face of the case 50 on the downstream side of the image writing unit 23 is provided with an opening 51 for being brought into contact with the developing roller 33 of the developing unit 24 in correspondence with each image carrier 20. A shielding portion 52 of the case 50 remains between each opening 51 and the image writing unit 23, further, a shielding portion 53 of the case 50 remains between the charging unit 22 and the image writing unit 23.

The shielding portions 52 and 53, particularly, the shielding portion 52 between the opening 51 and the image writing unit 23 prevents ultraviolet ray from reaching a light emitting portion comprising an organic EL material in the image writing unit 23 from outside. Numeral 72 designates a cleaning pad for wiping when a refractive index distributing type rod lens array 65 for covering an organic EL light emitting element array 61 from a front face is stained. The cleaning pad 72 is reciprocated by a handle, not illustrated. Numeral 61 designates the organic EL light emitting element array and numeral 65 designates the refractive index distributing type rod lens array.

Figure 14:
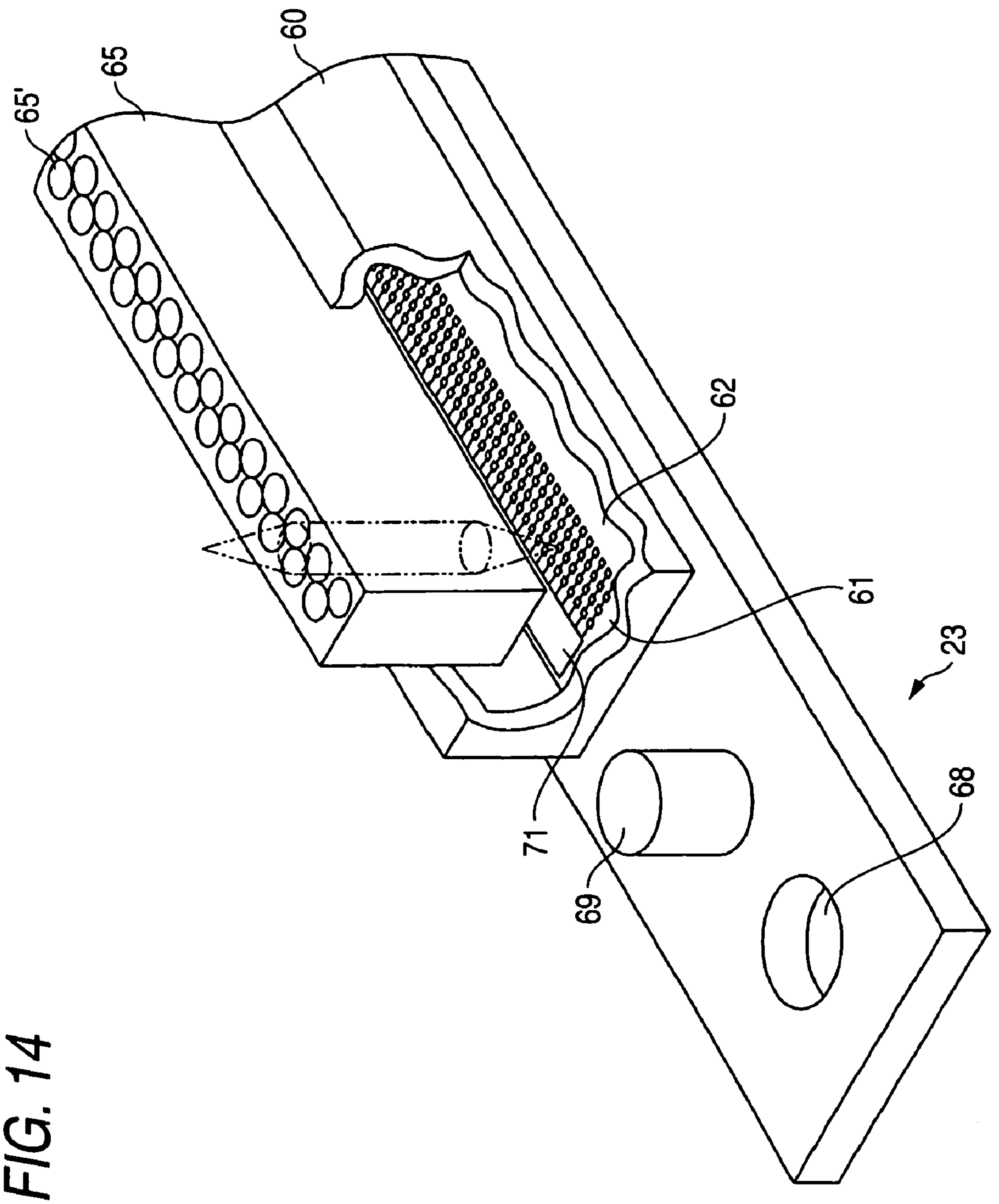
FIG. 14 is a perspective view showing an example of a line head.

FIG. 14 is a perspective view of an outline showing to enlarge the image writing unit 23. In FIG. 14, details of a line head provided at the image writing unit 23 are shown. There is shown a mechanism of accurately positioning the image writing unit 23 relative to each image carrier (sensitized drum) 20 attached to the image carrier unit 25. As shown in FIG. 12 and FIG. 13, the image carrier 20 is rotatably attached to inside of the case 50 of the image carrier unit 25 by a shaft thereof.

Meanwhile, the organic EL light emitting element array 61 is held at inside of a long housing 60. Each image writing unit 23 is fixed to a predetermined position by fitting positioning pins 69 provided at both ends of the long housing 60 and screwing fixing screws to fix into screw holes of the case 50 via screw inserting holes 68 provided at both ends of the long housing 60.

According to the image writing unit 23, the light emitting portion of the organic EL light emitting element array 61 is mounted on a glass board 62 and is driven by TFT 71 similarly formed on the glass board 62 The refractive index distributing type rod lens array 65 constitutes a focusing optical system and laminated with refractive index distributing type rod lenses 65' arranged at a front face of the light emitting portion layer by layer.

The housing 60 covers a surrounding of the glass board 62 and a side thereof facing the image carrier 20 is opened. In this way, light ray is emitted from the refractive index distributing type rod lens 6' to the image carrier 20. A face of the housing 60 opposed to an end face of the glass board 62 is provided with a light absorbing member (coating).

Figure 15:
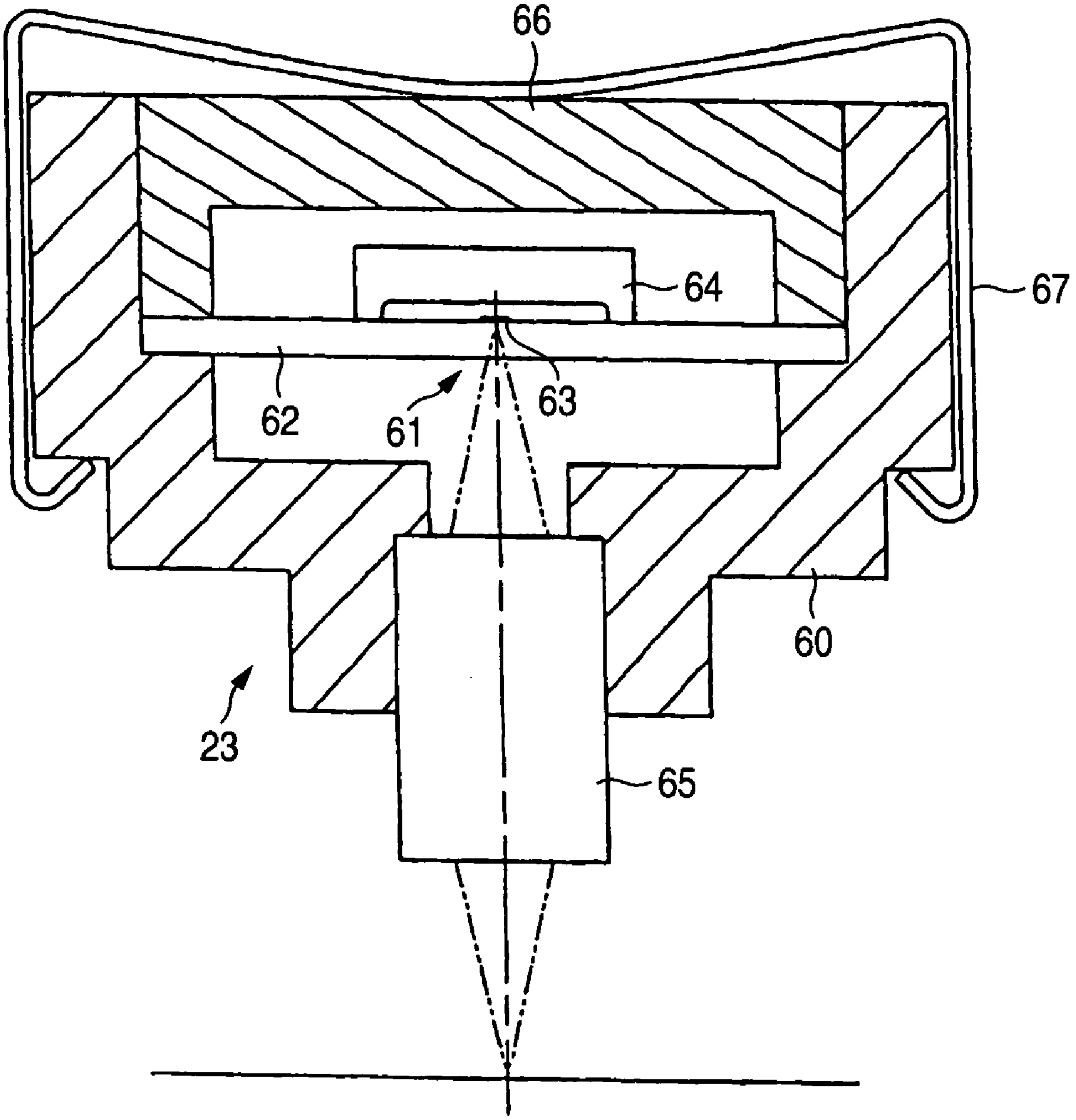
FIG. 15 is a sectional view in a sub scanning direction of an image writing unit.

FIG. 15 is a sectional view of the image writing unit 23 in the sub scanning direction. The image writing unit 23 is provided with the organic EL light emitting element array 61 attached to face the rear face of the refractive index distributing type rod lens array 65 in the housing 60 and a nontransparent cover 66 for shielding the organic EL right emitting element array 61 in the housing 60 from a rear face thereof.

Further, inside of the housing 60 is hermetically closed in light tight by pressing the cover 66 to the back face of the housing 60 by a fixing leaf spring 67. That is, the glass board 62 is hermetically shielded optically in the housing 60 by the fixing leaf spring 67. Therefore, light can be absorbed efficiently by preventing total reflection at the end face of the glass board 62. The fixing leaf springs 67 are provided at a plurality of portions in the longitudinal direction of the housing 60 (illustration thereof is omitted in FIG. 14).

In FIG. 15, a material of absorbing light, for example, synthetic resin of black color polystyrene or the like, aluminum subjected to almite treatment or the like is used for the housing 60 comprising the nontransparent member. Further, the end faces in the thickness direction on the both sides of the glass board 62, that is, the faces of the housing 60 opposed to the end faces in the thickness direction in the sub scanning direction are coated with a black color coating to promote light absorbing property.

In this way, according to the invention, the organic EL element is used as the light emitting element. Therefore, the light emitting element can easily be formed on the glass board. Therefore, the shape of the light emitting element can be constituted by an arbitrary shape and therefore, low price formation is achieved. Further, since the line head is used in the image forming apparatus, an image forming apparatus with inconsiderable deterioration in an image can be provided.

Figure 16:
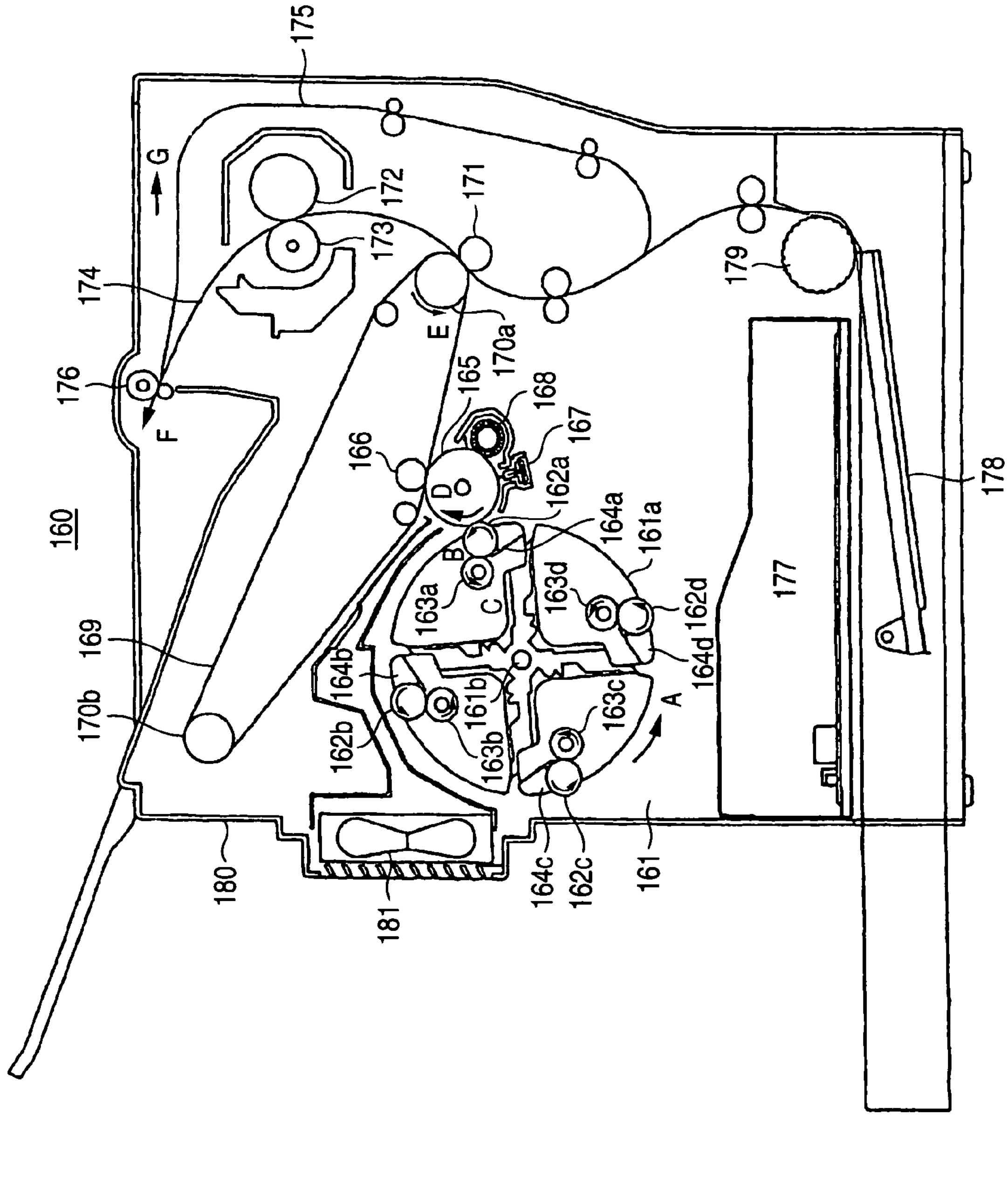
FIG. 16 is a constitution view of an image forming apparatus to which the invention is applied.
Figure 17A:
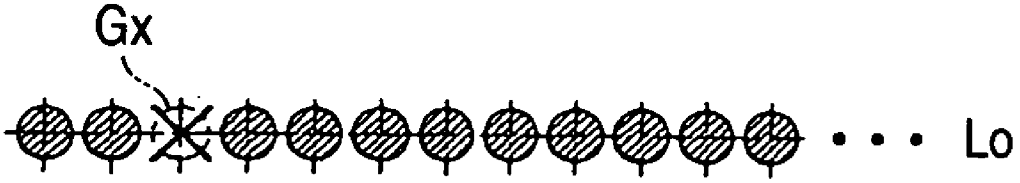
FIGS. 17A and 17B illustrate explanatory views of a related art.
Figure 17B:
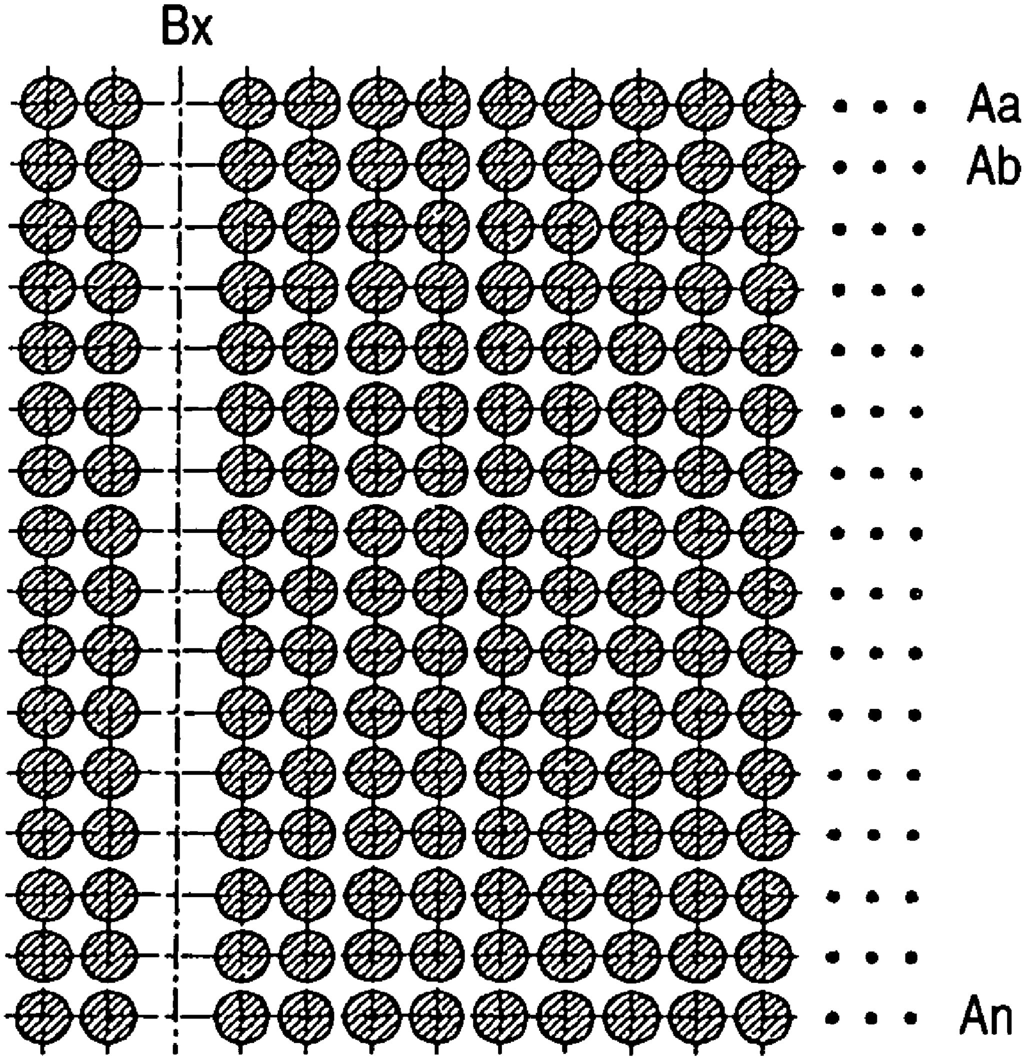
Figure 18A:
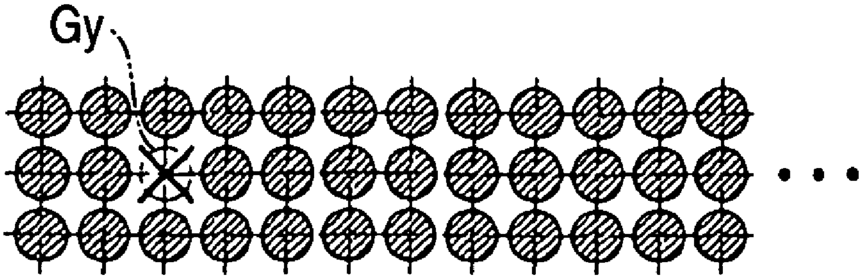
FIGS. 18A and 18B illustrate explanatory views of a related art.
Figure 18B:
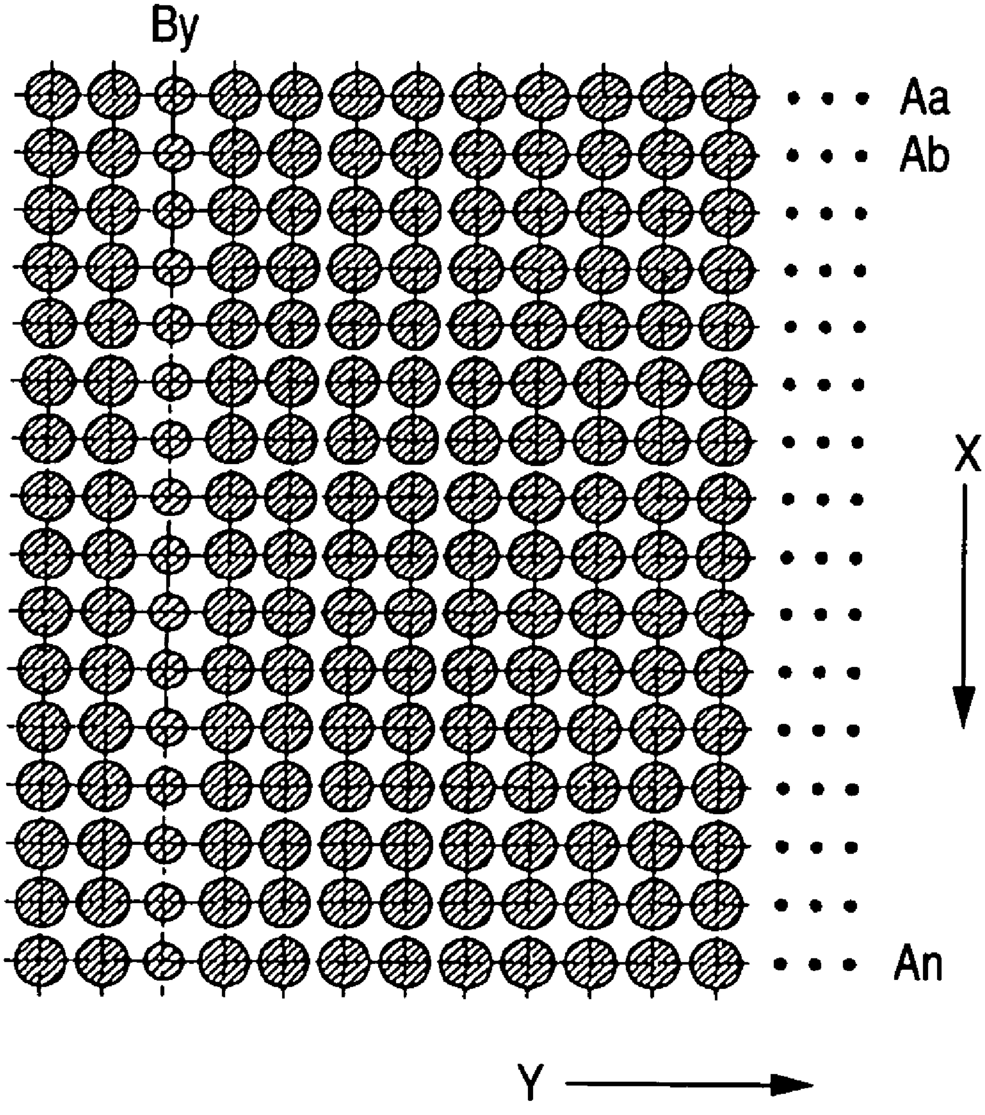

Next, other example of an image forming apparatus according to the invention will be explained. FIG. 16 is a constitution view of an image forming apparatus to which the above embodiments of the invention is applied. In FIG. 16, an image forming apparatus 160 is provided with a developing apparatus 161 in a rotary constitution, a sensitized drum 165 functioning as an image carrier, an image writing unit 167 provided with the organic EL array, a intermediate transfer belt 169, a heating roller 172 of a fixer, a sheet transporting path 174 and a sheet feeding tray 178 as main constituent members.

According to the developing apparatus 161, a developing rotary 161 a is rotated in an arrow mark A direction centering on a shaft 161*a*. Inside of the developing rotary 161*a* is divided in four and respective divisions are provided with image forming units of four colors of yellow (Y), cyan (C), magenta (M) and black (K). Notations 1622*a* through 162*d* designate developing rollers arranged at the respective image forming units of four colors and rotated in an arrow mark B direction and notations 163*a* through 163*d* designate toner supply rollers rotated in an arrow mark C direction Further, notations 164*a* through 164*d* designate restricting blades restricting the toner by a predetermined thickness.

Numeral 165 designates the sensitized drum functioning as the image carrier as described above, numeral 166 designates a primary transfer member, numeral 168 designates a charger, numeral 167 designates the image writing unit provided with the organic EL array. The sensitized drum 165 is driven in an arrow mark D direction which is a direction reverse to that of the developing roller 162*a* by a drive motor, not illustrated, for example, a step motor.

The intermediate transfer belt 169 is stretched between a driven roller 170*b* and a drive roller 170*a* and the drive roller 170*a* is conneted to the drive motor of the sensitized drum 165 to thereby transmit power to the intermediate transfer belt. By driving the drive motor, the drive roller 170*a* of the intermediate transfer belt 169 is rotated in an arrow mark E direction which is a direction reverse to that of the sensitized drum 165.

The sheet transporting path 174 is provided with a plurality of transporting rollers, a discharge roller pair 176 and the like to transport sheet. An image (toner image) on one face carried by the intermediate transfer belt 169 is transcribed onto one fee of sheet at a position of a secondary transfer roller 171. The secondary transfer roller 171 is brought into contact with and separated from the intermediate transfer belt 169 by a clutch and is brought into contact with the intermediate transfer belt 169 by making the clutch ON to transcribe the image on sheet.

The sheet transcribed with the image as described above is subjected to a fixing treatment by a fixer having a fixing heater H. The fixer is provided with the heating roller 172 and a pressing roller 173. The sheet after the fixing treatment advances in an arrow mark F direction by being drawn into the discharge roller pair 176. When the discharge roller pair 176 is rotated in a reverse direction from the state, the sheet is reversed in the direction and advances in an arrow mark G direction on a transport path 175 for both faces printing. Numeral 177 designates an electric equipment box, numeral 178 designates the sheet feeding tray for containing sheet and numeral 179 designates a pickup roller provided at an outlet of the sheet feeding tray 178.

A brushless motor of low speed is used for a drive motor for driving the transporting rollers in the sheet transporting path. Further, a step motor is used for the intermediate transfer belt 169 since color shift correction or the like is needed. The respective motors are controlled by signals from a controlling unit, not illustrated. In a state of FIG. 16, an electrostatic latent image of yellow (Y) is formed on the sensitized drum 165 and an image of yellow is formed on the sensitized drum 165 by applying high voltage to the developing roller 162*a*. When all of images on a rear side and a surface side of yellow are carried by the intermediate transfer belt 169, the developing rotary 160*a* is rotated by 90 degrees in the arrow mark A direction.

The intermediate transfer belt 169 is rotated by one rotation to return to the position of the sensitized drum 15. Next, images of two faces of cyan (C) are formed on the sensitized drum 165 and the images are overlapped on images of yellow carried by the low transfer belt 169 to carry. In the following, processings of rotation of the developing roller 161 by 90 degrees and one rotation of the intermediate transfer belt 169 after carrying the images are similarly repeated. In carrying color images of four colors, the intermediate transfer belt 169 is rotated by four rotations and the rotational position is further controlled thereafter to transcribe the images on the sheet at the position of the secondary transfer roller 171.

Sheet fed from the sheet feeding tray 178 is transported by the transporting path 174 and the color image is transcribed on one face of sheet at the position of the secondary transfer roller 171. The sheet transcribed with the image on one face thereof is reversed by the discharge roller pair 176 as described above and is at standby at the transporting path. Thereafter, the sheet is transported to the position of the secondary transfer roller 171 at a pertinent timing and is transcribed with the color image on other face thereof. A housing 180 is provide with an exhausting fan 181.

As described above an explanation has been given of the line head and the image forming apparatus using the same according to the invention based on the several embodiments. According to the invention, the image forming apparatus in which the image quality is not deteriorated can be provided. The invention is not limited to the embodiments but can variously be modified.

Further, when two columns of light emitting elements are arranged in a line head and one column thereof is made to be light emitting in Table 1 by the constitution of the invention, a probability that a pixel defect is present at the light emitting element column to be light emitting becomes 0.2×0.2=0.04 and yield becomes 96%. Similarly, when three columns of light emitting elements are arranged in a line head and one column thereof is made to be light emitting, a probability that a pixel defect is present in the light emitting element column to be light emitting becomes 0.2×0.2×0.2=0.008 and the yield becomes 99.2%. By increasing the light emitting element columns in this way, the defect rate of the line head can be promoted.

Further, according to the example of carrying out multiple exposure of Table 2, in the case of using two columns of light emitting element columns, when three columns of light emitting element columns are arranged in a line head and two columns thereof are selected to be light emitting, the yield of the line head is increased to 89.6%. Further, in the case of using three columns of light emitting element columns of Table 3, when three columns are selected from four columns of light emitting element columns arranged in a line head, the defect rate of the line head is increased to 81.92%.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A line head, comprising:

a plurality of light emitting element columns, including:

a main light emitting element column, exposing a light amount necessary for exposure to an image carrier; and an auxiliary light emitting element column, exposing the image carrier so as to obtain the light amount necessary for exposure even when a light emitting element having a pixel defect is existed in the main light emitting element column, wherein the auxiliary light emitting element column has a plurality of light emitting elements which correspond to a plurality of light emitting elements of the main light emitting element column respectively; and wherein the light emitting elements of the auxiliary light emitting element column respectively emit light to dots of an image region on the image carrier to which the corresponding light emitting elements of the main light emitting element column emit light.

2. A line head, comprising:

a plurality of light emitting element columns, including:

a main light emitting element column, exposing a light amount necessary for exposure to an image carrier; and an auxiliary light emitting element column, exposing the image carrier so as to obtain the light amount necessary for exposure even when a light emitting element having a pixel defect is existed in the main light emitting element column, wherein the auxiliary light emitting element column exposes the image carrier so that an amount of a change in differences between a surface potential Vs|V| and a developing bias potential Vd|V| of the image carrier in a case that the pixel defect is existed at the light emitting elements of the light emitting element columns and in a case that the pixel defect is not existed is equal to or smaller than 10%.

3. A line head, comprising:

a plurality of light emitting element columns, including:

a main light emitting element column, exposing a light amount necessary for exposure to an image carrier; and an auxiliary light emitting element column, exposing the image carrier so as to obtain the light amount necessary for exposure even when a light emitting element having a pixel defect is existed in the main light emitting element column, wherein at least one of a light attenuating characteristic (PIDC characteristic) of the image carrier and a light amount of the light emitting elements is set so that an amount of a change in differences between a surface potential Vs|V| and a developing bias potential Vd|V| of the image carrier in a case that the pixel defect is existed at the light emitting elements of the light emitting element columns and in a case that the pixel defect is not existed is equal to or smaller than 10%.

4. The line head as set forth in claim 3, wherein the light emitting elements are organic EL elements.

5. An image forming apparatus, comprising:

a line head, comprising:

a plurality of light emitting element columns, including:

a main light emitting element column, exposing a light amount necessary for exposure to an image carrier; and an auxiliary light emitting element column, exposing the image carrier so as to obtain the light amount necessary for exposure even when a light emitting element having a pixel defect is existed in the main light emitting element column;

an image carrier cartridge, to which the line head is mounted;

a charging unit, charging the image carrier;

a developing unit, developing a toner image on the image carrier; and a transfer unit, transferring the toner image formed on the image carrier onto a transfer medium.

6. A line head, comprising:

a plurality of light emitting element columns, including:

a main light emitting element column, exposing an image carrier; and an auxiliary light emitting element column, exposing the image carrier when a light emitting element having a pixel defect is existed in the main light emitting element column, wherein when the light emitting element having the pixel defect is existed in the main light emitting element column, a light emitting of the main light emitting element column including the light emitting element having the pixel detect is stopped; and wherein all of the light emitting elements of the auxiliary light emitting element column emit light.

7. The line head as set forth in claim 6, wherein information regarding the main light emitting element column including the light emitting element having the pixel defect is stored in a storing member.

8. A line head. comprising:

a plurality of light emitting element columns, including:

a main light emitting element column, exposing an image carrier; and an auxiliary light emitting element column, exposing the image carrier when a light emitting element having a pixel defect is existed in the main light emitting element column, wherein when the light emitting element having the pixel defect is existed in the main light emitting element column, a light emitting of the light emitting element having the pixel detect is stopped; and wherein a light emitting element of the auxiliary light emitting element column corresponding to the light emitting element having the pixel defect emits light so as to compensate a light emitting of the stopped light emitting element.

9. The line head as set forth in claim 8, wherein information regarding a position of the light emitting element having the pixel defect in the main light emitting element column is stored in a storing member.

10. An image forming apparatus, comprising:

a line head, comprising:

a plurality of light emitting element columns, including:

a main light emitting element column, exposing an image carrier; and an auxiliary light emitting element column, exposing the image carrier when a light emitting element having a pixel defect is existed in the main light emitting element column;

an image carrier cartridge, to which the line head is mounted;

a charging unit, charging the image carrier;

a developing unit, developing a toner image on the image carrier; and a transfer unit, transferring the toner image formed on the image carrier onto a transfer medium.

11. The image forming apparatus as set forth in claim 10, wherein the storing member is provided at the cartridge.

12. The image forming apparatus as set forth in claim 10, wherein the storing member is provided on a main body side.

13. An image forming apparatus, comprising:

a line head, comprising:

a plurality of light emitting element columns, exposing an image carrier, wherein when a light emitting element having the pixel defect is existed in one light emitting element column of the light emitting element columns, a light emitting of the light emitting element having the pixel detect is stopped; and wherein a light emitting amount of a light emitting element in another light emitting element column of the light emitting element columns which corresponds to the light emitting element having the pixel defect is increased so as to compensate a light emitting of the stopped light emitting element;

an image carrier cartridge, to which the line head is mounted;

a charging unit, charging the image carrier;

a developing unit, developing a toner image on the image carrier; and a transfer unit, transferring the toner image formed on the image carrier onto a transfer medium.

14. The image forming apparatus as set forth in claim 13, wherein the storing member is provided at the cartridge.

15. The image forming apparatus as set forth in claim 13, wherein the storing member is provided on a main body side.

* * * * *